(12) United States Patent
Takada et al.

(10) Patent No.: US 11,940,166 B2
(45) Date of Patent: Mar. 26, 2024

(54) AIR CONDITIONING SYSTEM FOR TRANSFERRING AIR IN AN AIR-CONDITIONED ROOM

(71) Applicant: Panasonic Intellectual Property Management Co., Ltd., Osaka (JP)

(72) Inventors: Yoshiomi Takada, Aichi (JP); Naoyuki Funada, Aichi (JP); Koki Ando, Aichi (JP); Ayumi Konishi, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 178 days.

(21) Appl. No.: 17/435,410

(22) PCT Filed: Feb. 17, 2020

(86) PCT No.: PCT/JP2020/006137
§ 371 (c)(1),
(2) Date: Mar. 2, 2022

(87) PCT Pub. No.: WO2020/195337
PCT Pub. Date: Oct. 1, 2020

(65) Prior Publication Data
US 2023/0105512 A1  Apr. 6, 2023

(30) Foreign Application Priority Data

Mar. 26, 2019 (JP) ................................ 2019-057584
Sep. 24, 2019 (JP) ................................ 2019-173008

(51) Int. Cl.
*F24F 11/47* (2018.01)
*F24F 3/044* (2006.01)
(Continued)

(52) U.S. Cl.
CPC .............. *F24F 11/47* (2018.01); *F24F 3/044* (2013.01); *F24F 7/08* (2013.01); *F24F 11/54* (2018.01)

(58) Field of Classification Search
CPC .................................... F24F 11/47; F24F 7/08
See application file for complete search history.

(56) References Cited

U.S. PATENT DOCUMENTS

2014/0097257 A1   4/2014  Matsumoto
2014/0222241 A1*  8/2014  Ols ......................... F24F 11/70
                                                              700/299
(Continued)

FOREIGN PATENT DOCUMENTS

JP   2007-107871 A   4/2007
JP   2009-127965 A   6/2009
(Continued)

OTHER PUBLICATIONS

International Search Report for corresponding Application No. PCT/JP2020/006137, dated Mar. 31, 2020.

*Primary Examiner* — Nathan L Laughlin
(74) *Attorney, Agent, or Firm* — Renner, Otto, Boisselle & Sklar, LLP

(57) ABSTRACT

An air conditioning system is provided, which includes a transfer fan for transferring air to a room as a space in a house from an air-conditioned room, a motion sensor for detecting whether the room is occupied or unoccupied and an air conditioning system controller for controlling the transfer fan. In the air conditioning system, a target air conditioning environment obtaining section obtains at least a target air conditioning environment of the room, an occupied-room air conditioning environment section controls the transfer fan that transfers air to the occupied room to approximate the occupied room to the target air conditioning environment according to information from the (Continued)

motion sensor and an unoccupied-room air conditioning environment section controls the transfer fan that transfers air to the unoccupied room to approximate the unoccupied room to a quasi-target air conditioning environment where an energy burden is lower than that of the occupied room according to information from the motion sensor.

15 Claims, 14 Drawing Sheets

(51) Int. Cl.
*F24F 7/08* (2006.01)
*F24F 11/54* (2018.01)

(56) References Cited

U.S. PATENT DOCUMENTS

| | | |
|---|---|---|
| 2015/0136378 A1 | 5/2015 | Maeda |
| 2015/0168002 A1* | 6/2015 | Plitkins .................... F24F 11/52 |
| | | 165/268 |
| 2016/0245569 A1 | 8/2016 | Unezaki et al. |
| 2018/0363933 A1* | 12/2018 | Ross ........................ F24F 11/77 |
| 2019/0182069 A1* | 6/2019 | Gervais ............. G05D 23/1917 |
| 2020/0149773 A1* | 5/2020 | Amundson ............. F24F 11/56 |
| 2020/0182505 A1* | 6/2020 | Shinozaki ................ F24F 11/83 |
| 2021/0216918 A1* | 7/2021 | Shaikh ............... G06Q 10/0631 |

FOREIGN PATENT DOCUMENTS

| | | |
|---|---|---|
| JP | 2011-127845 A | 6/2011 |
| JP | 2015-172482 A | 10/2015 |
| WO | 2013/190911 A1 | 12/2013 |
| WO | 2015/068277 A1 | 5/2015 |

* cited by examiner

【Fig. 1】
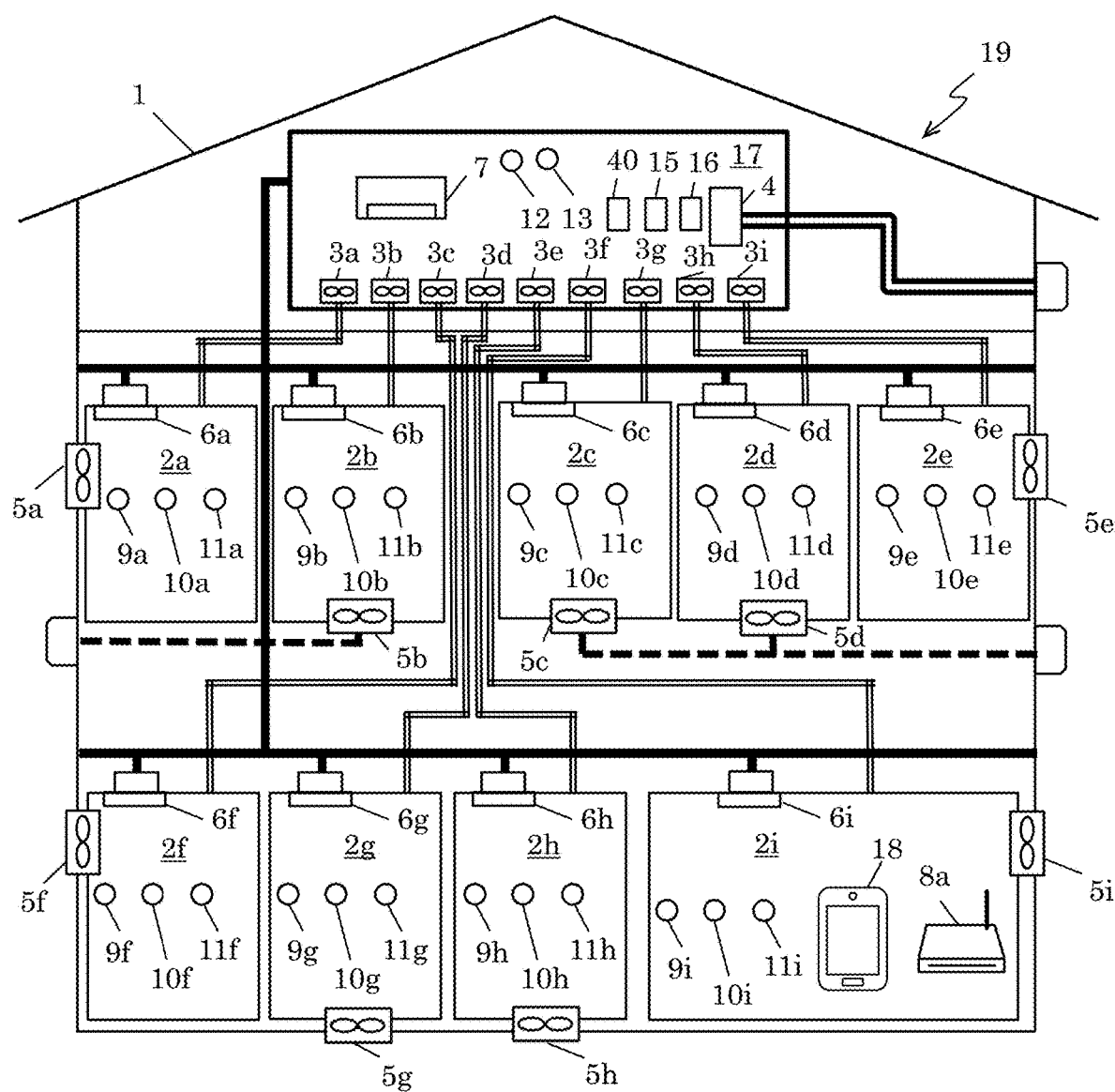

[Fig. 2]
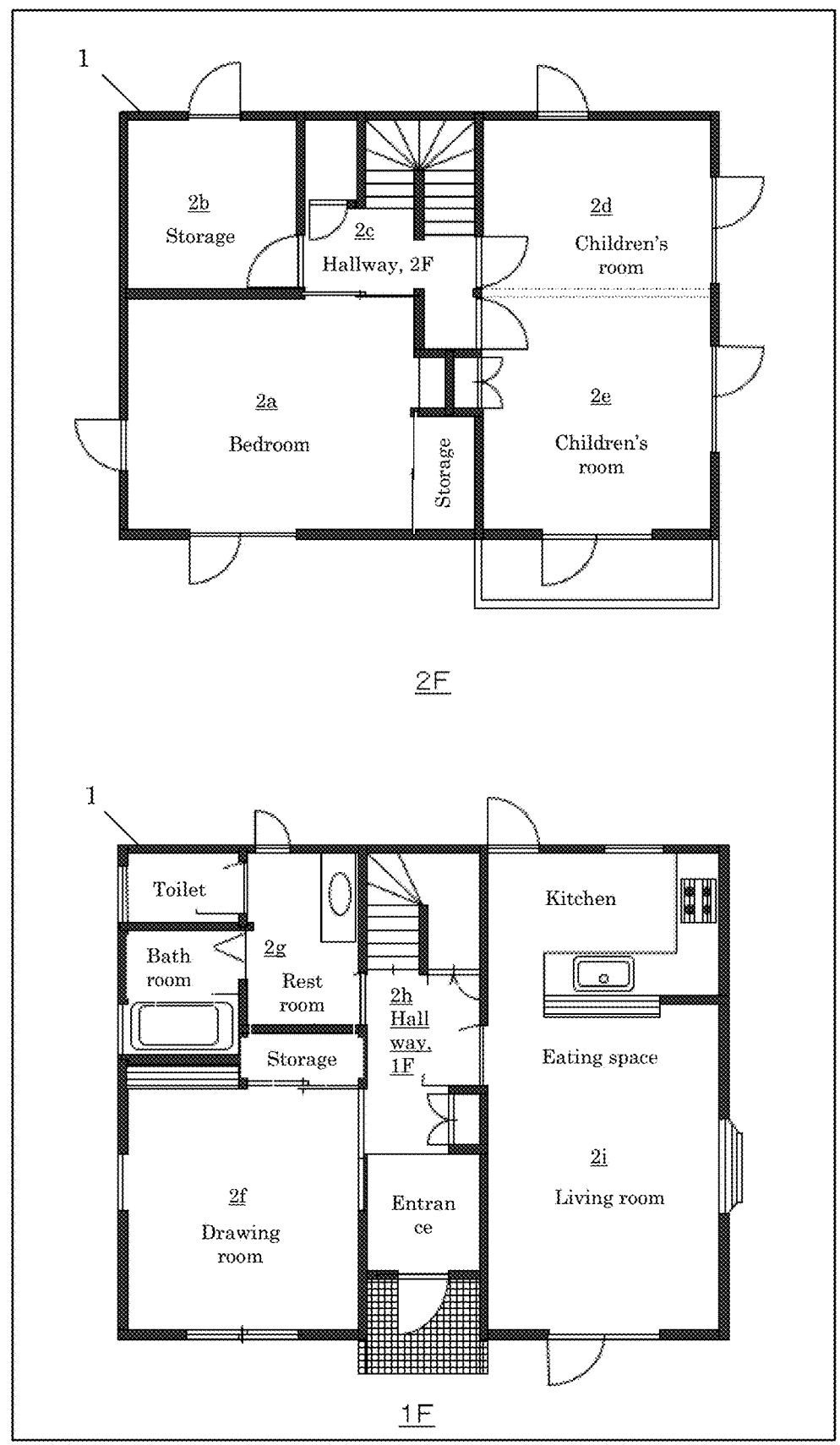

[Fig. 3]
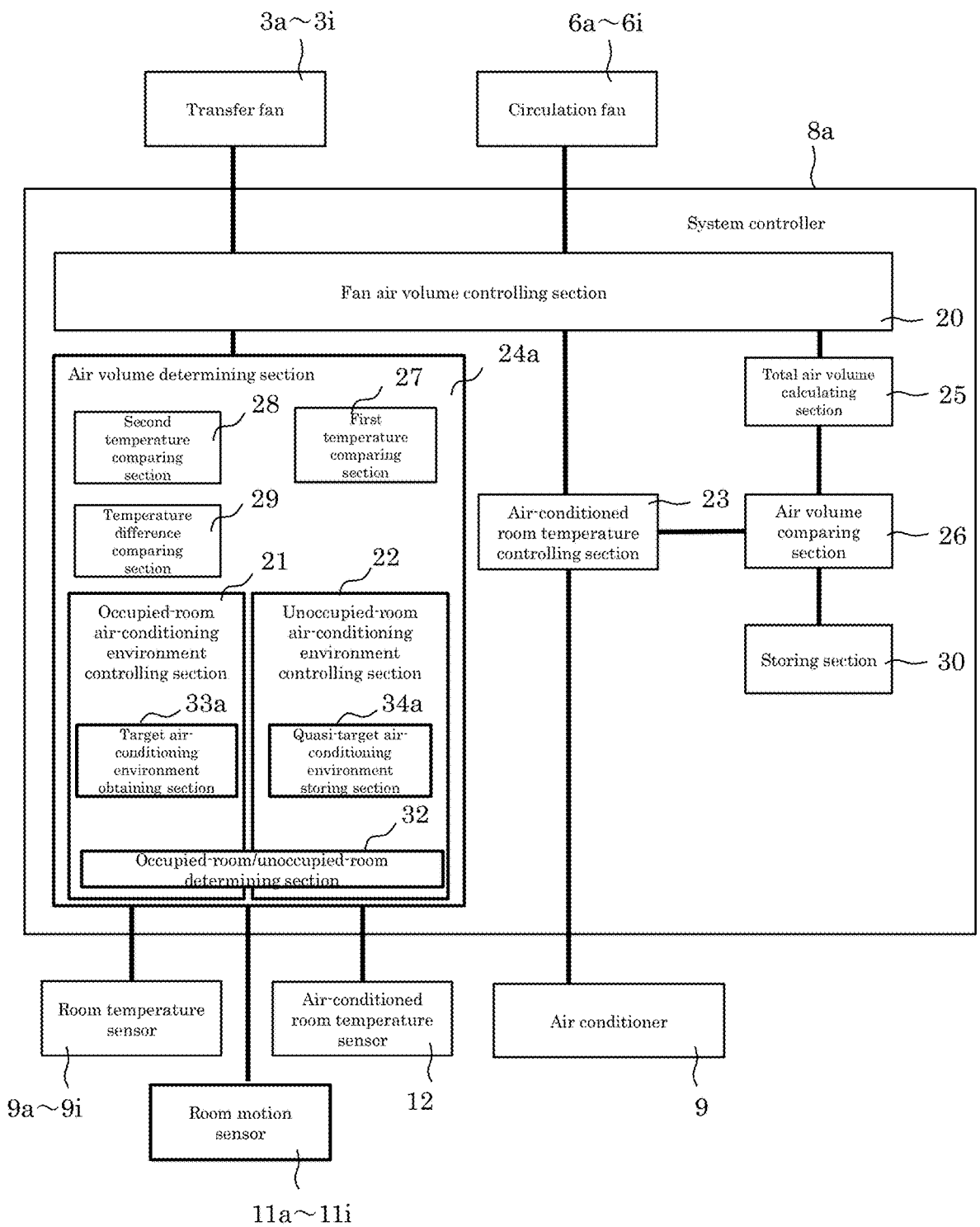

[Fig. 4]
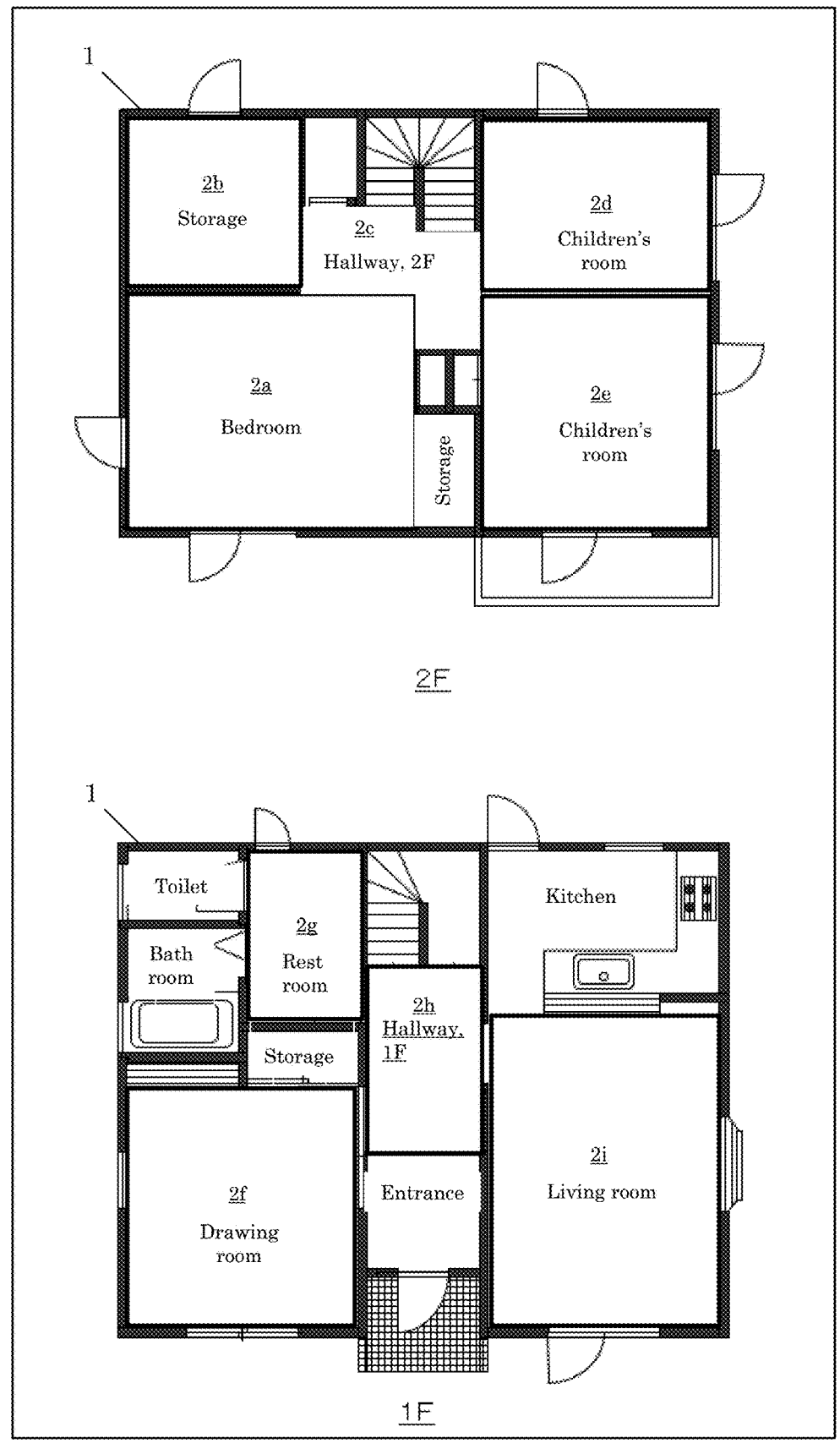

[Fig. 5]
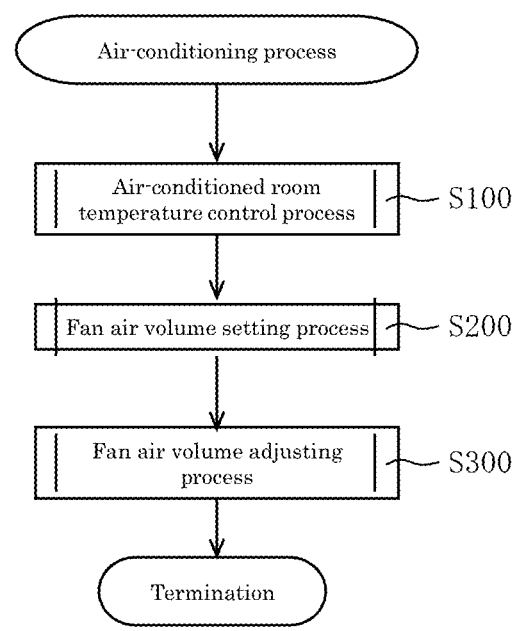

[Fig. 6]
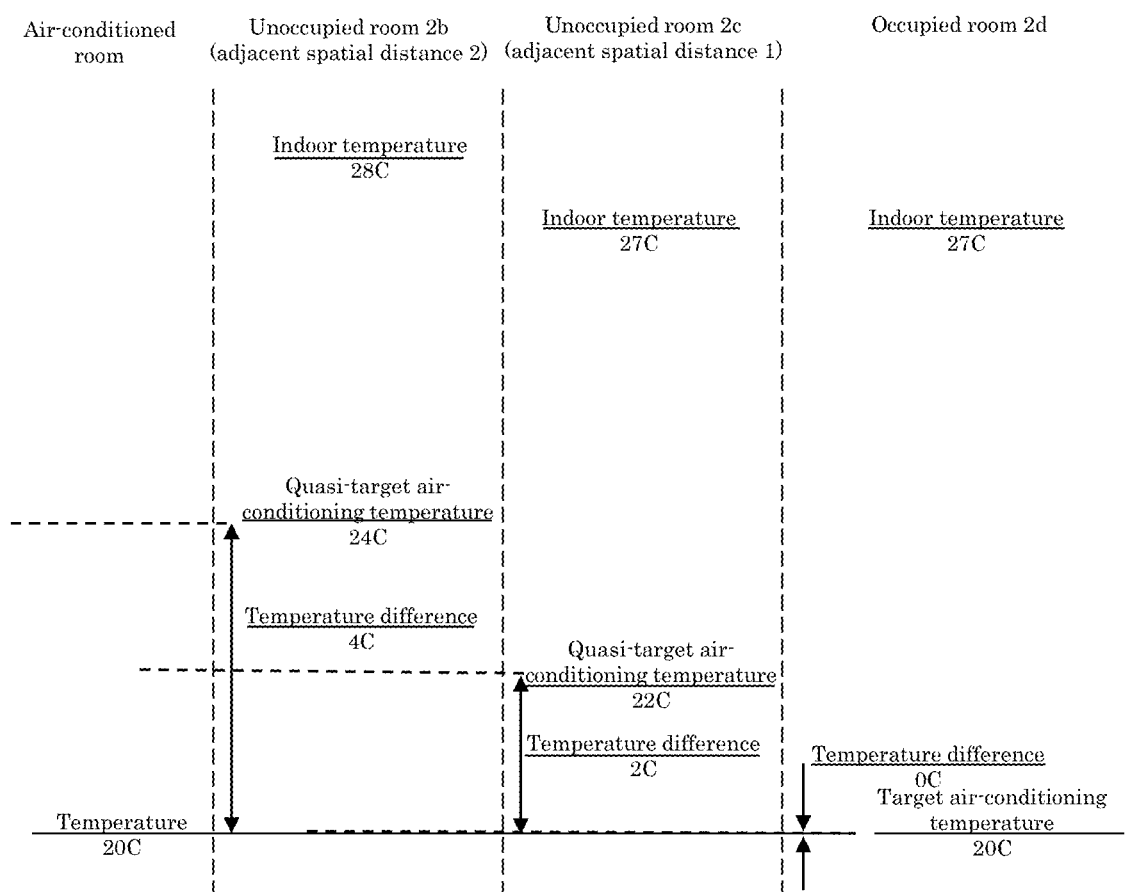

[Fig. 7]
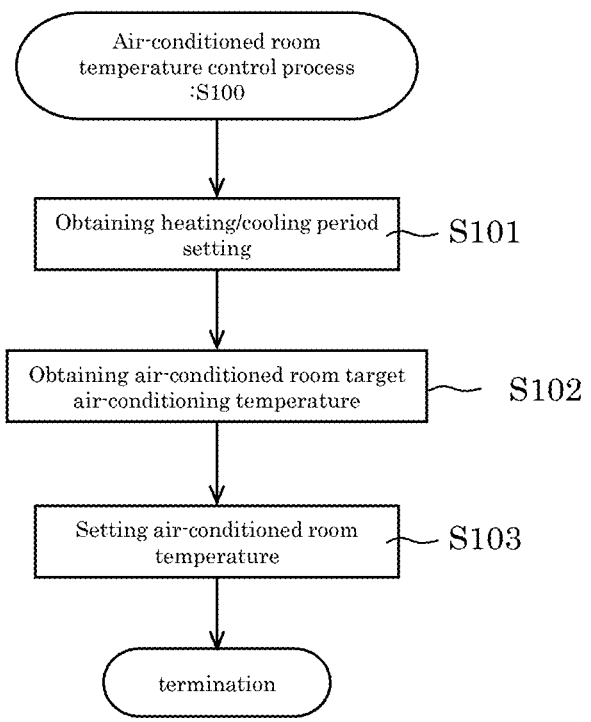

[Fig. 8]
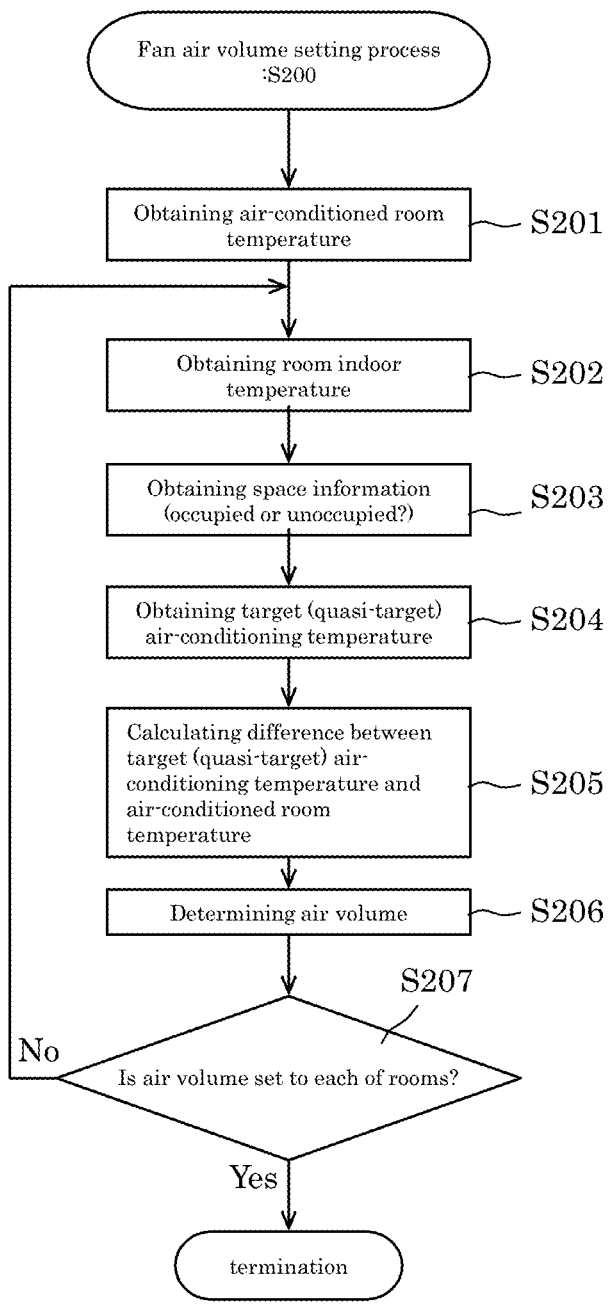

[Fig. 9]
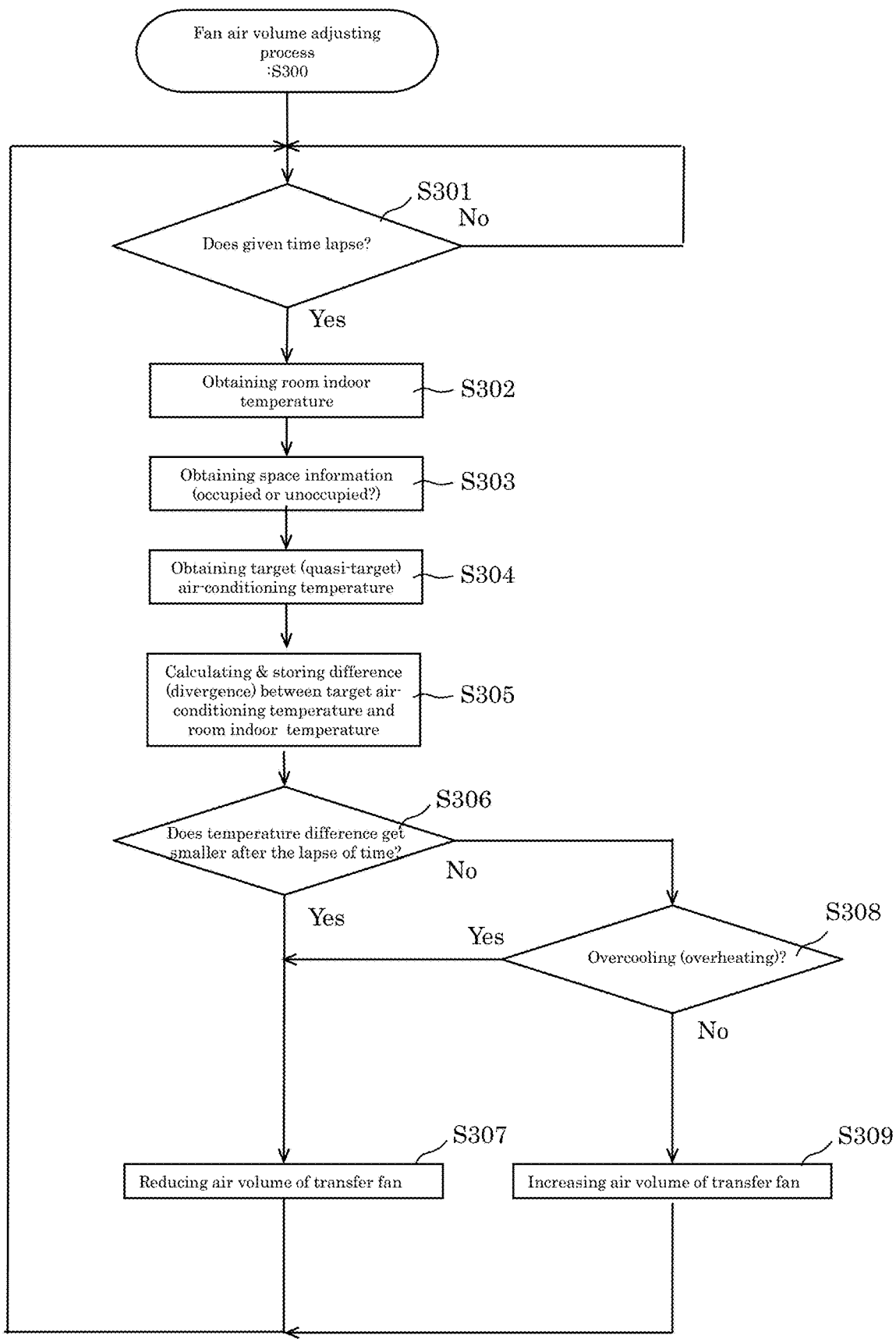

[Fig. 10]
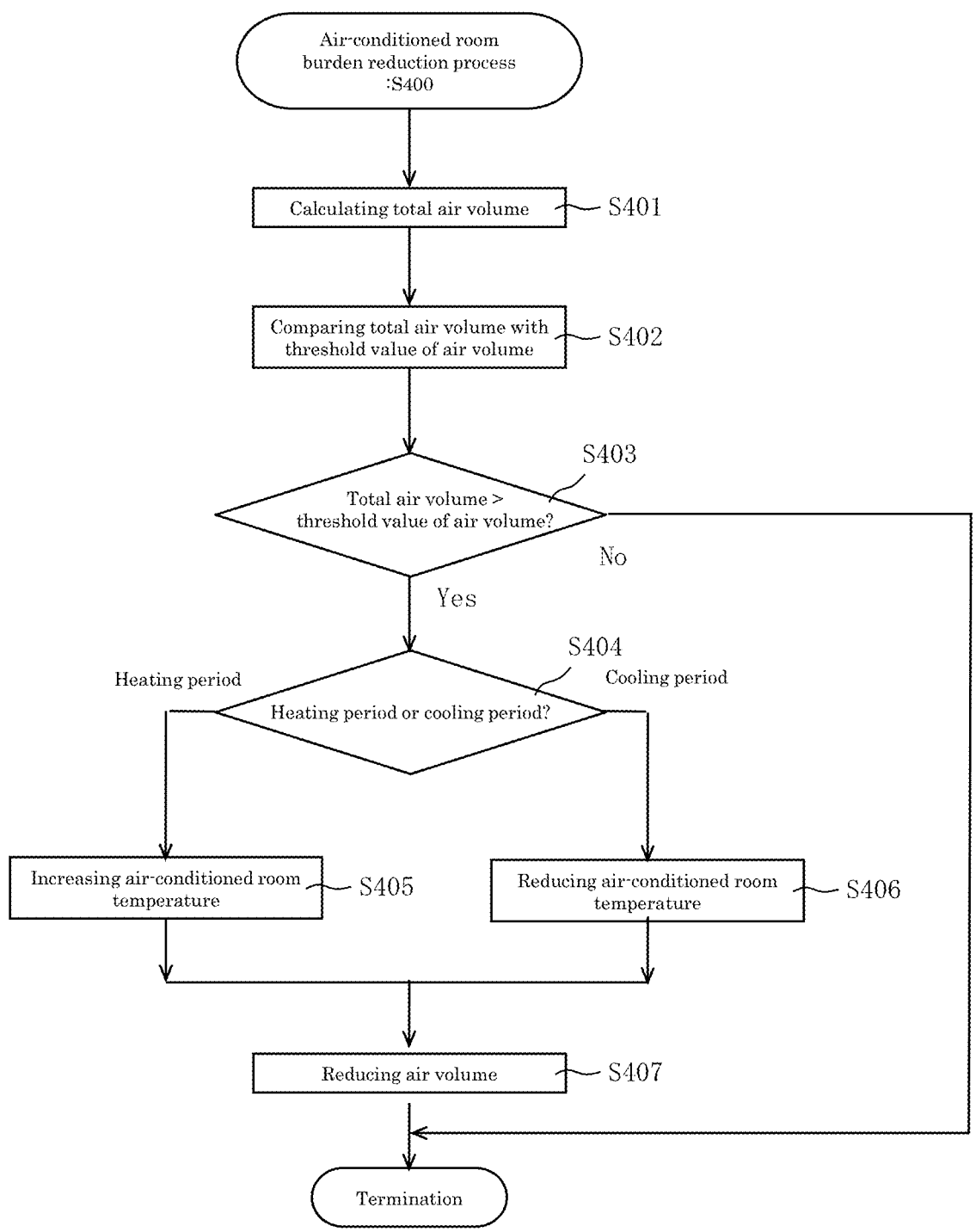

[Fig. 11]
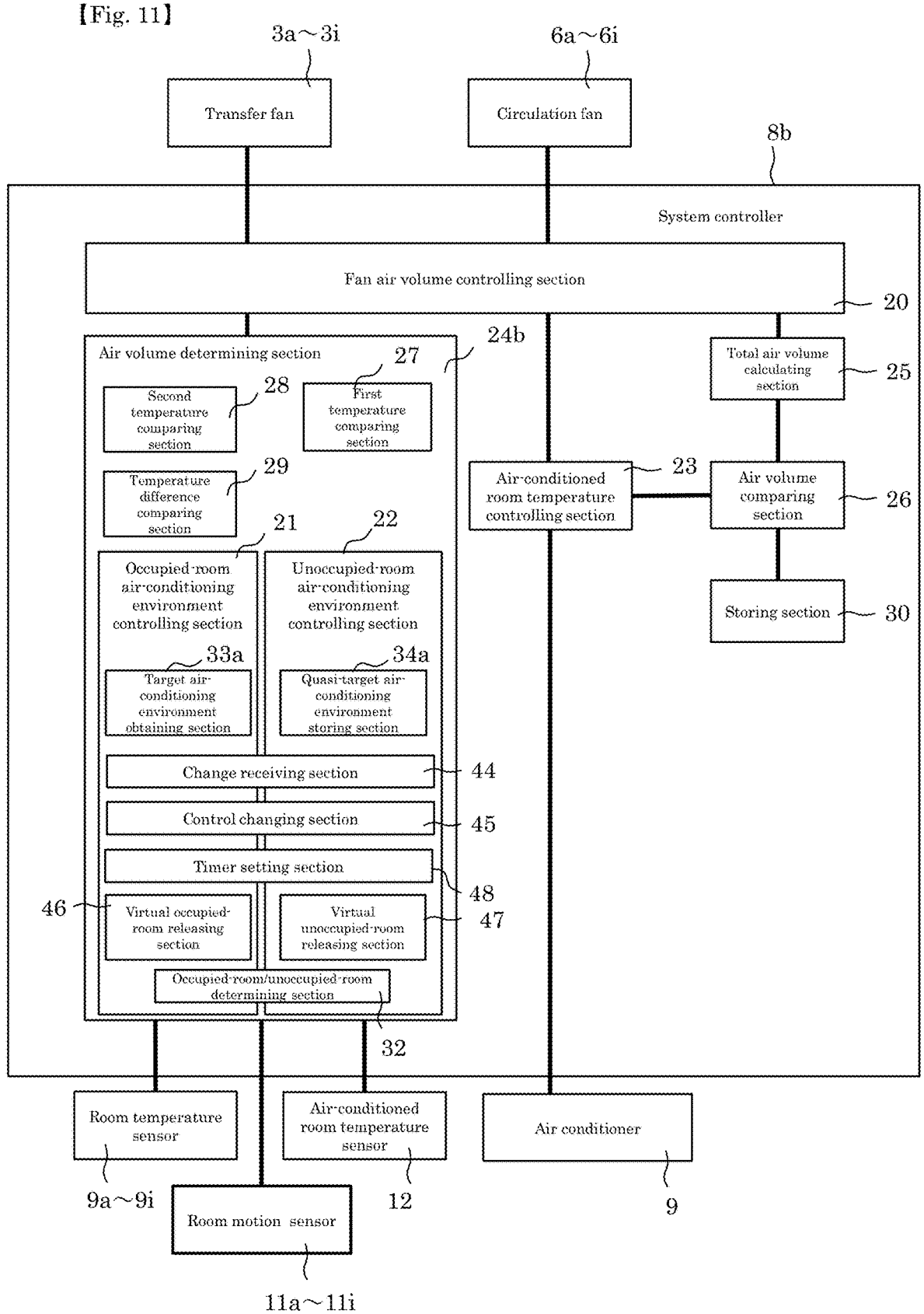

[Fig. 12]
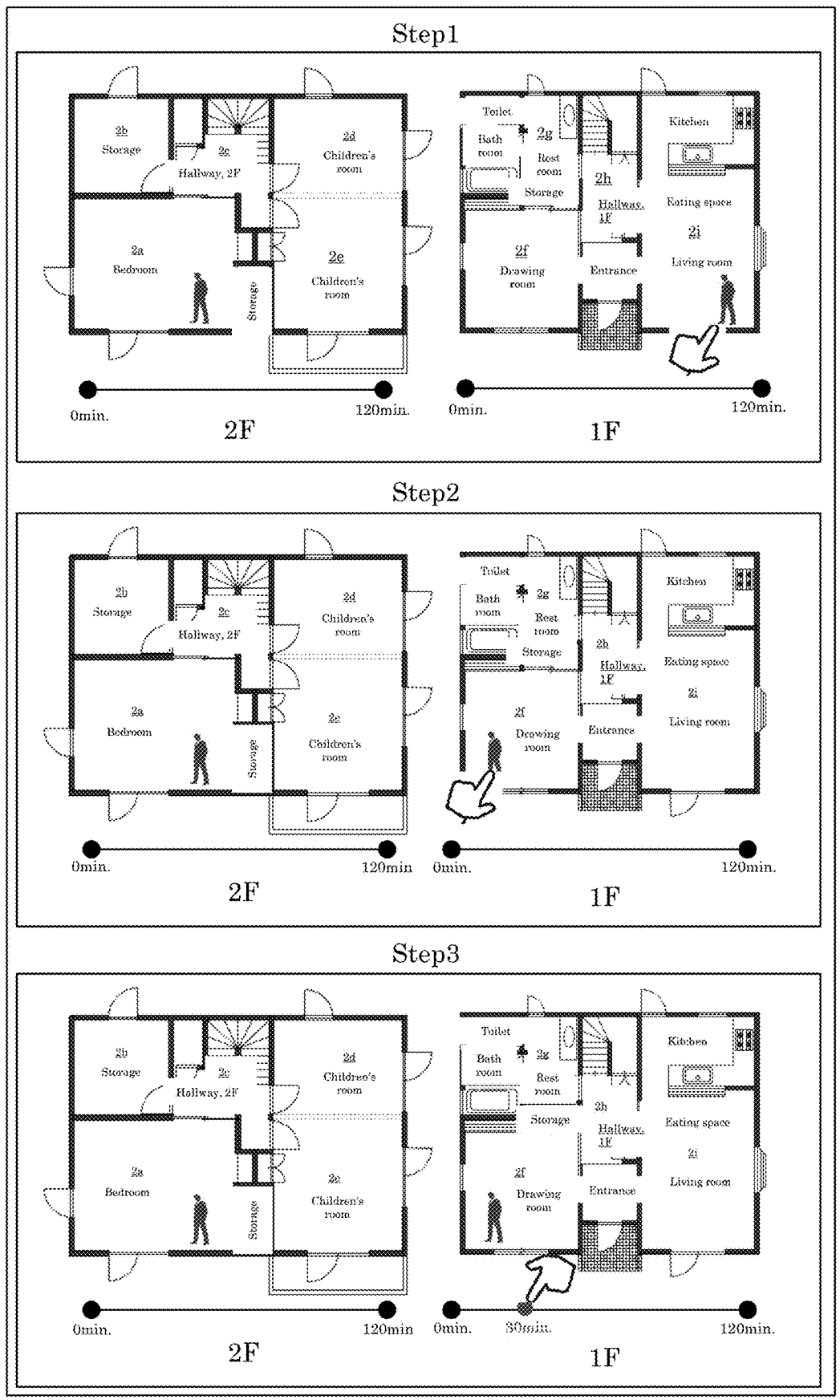

【Fig. 13】
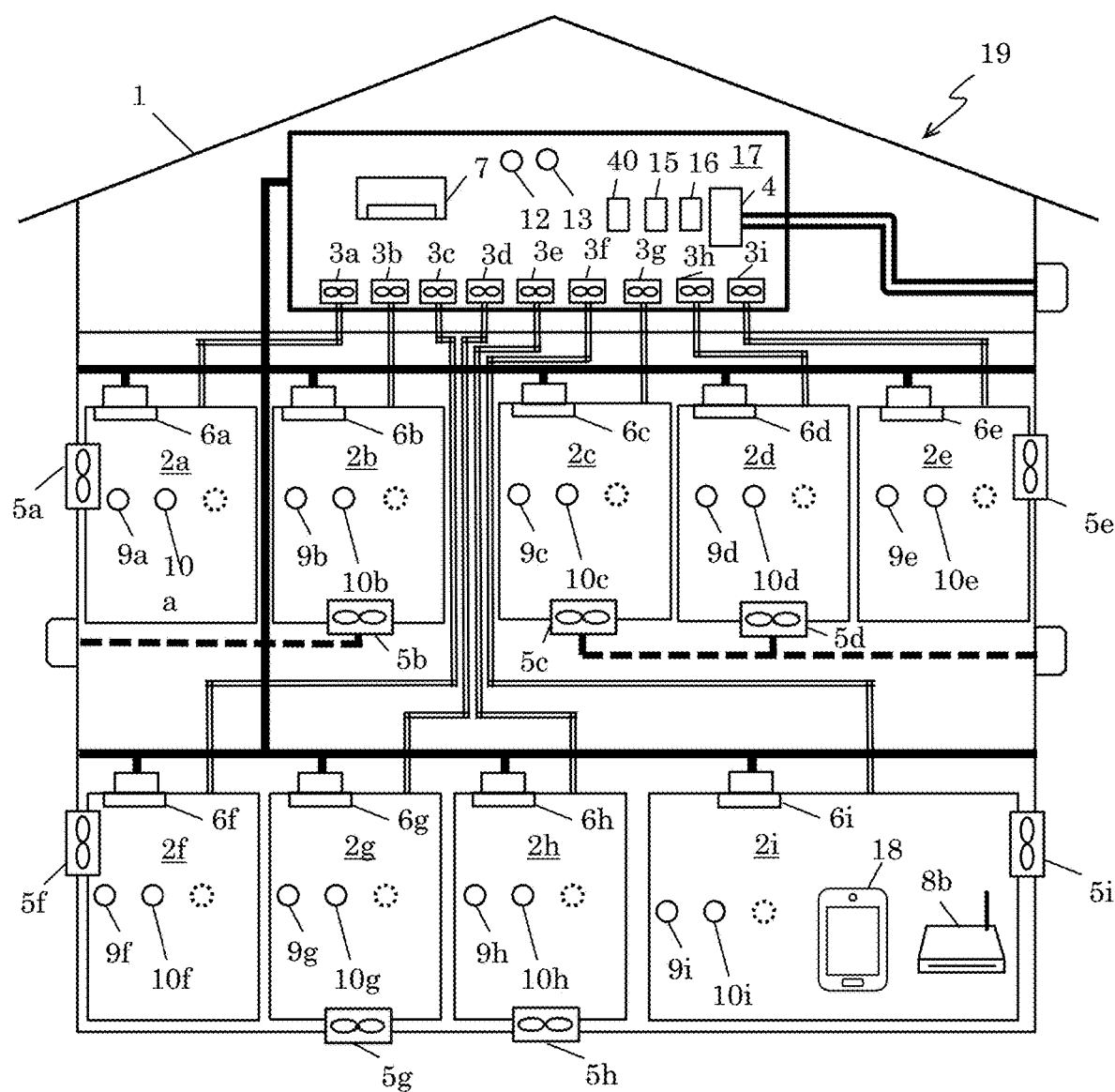

[Fig. 14]
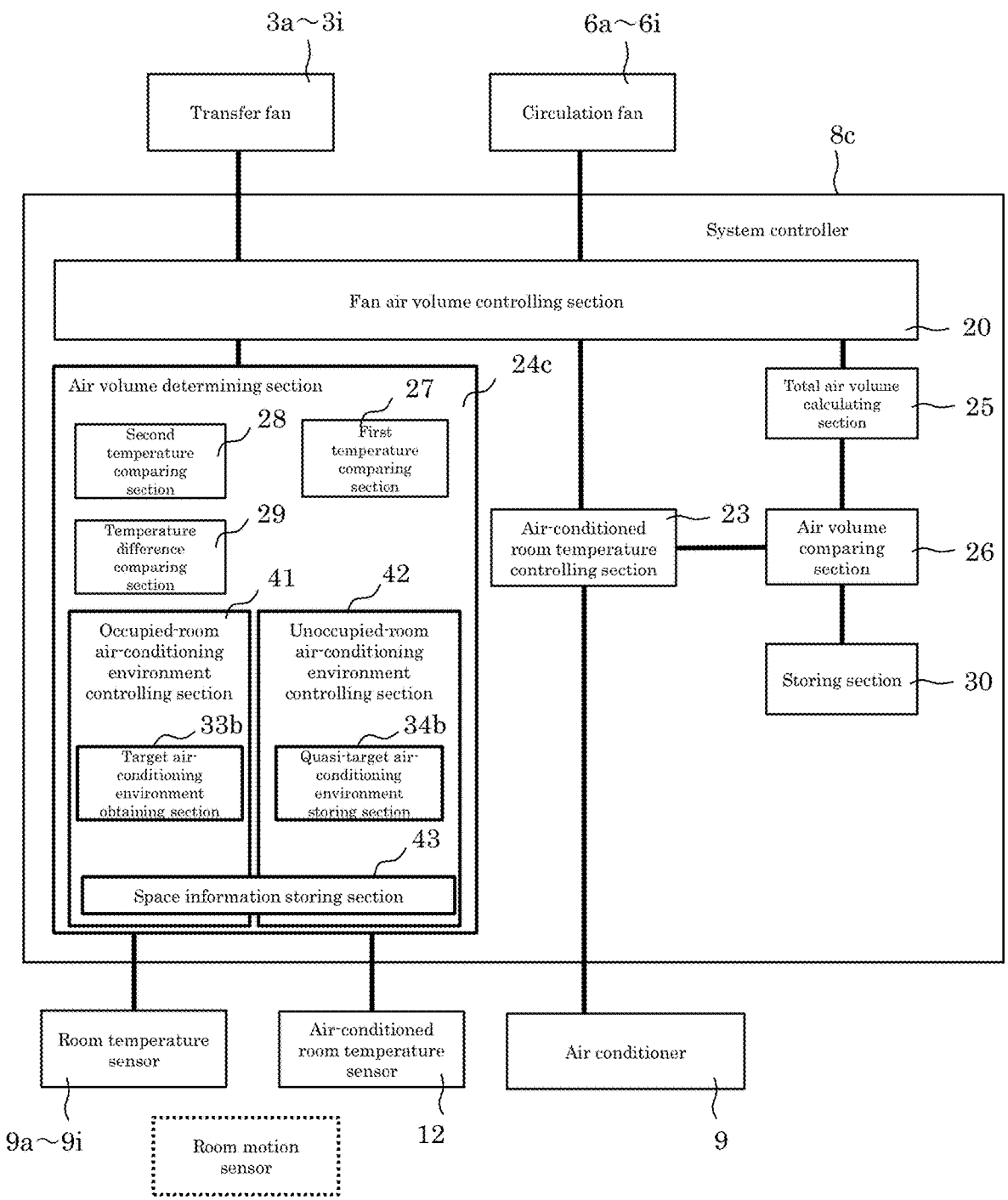

AIR CONDITIONING SYSTEM FOR TRANSFERRING AIR IN AN AIR-CONDITIONED ROOM

TECHNICAL FIELD

The present disclosure relates to an air conditioning system.

BACKGROUND ART

Conventionally, a residence is equipped with a whole-house air-conditioner for air conditioning. Along with an increasing demand in energy-saving house and tightening regulations, a super-insulated house is expected to increase, therefore, an air conditioning system suitable for such features is desired.

For example, as indicated in PTL 1, a method is known, in a super-insulated house where multiple rooms are included, an air conditioner is installed independently from each of the multiple rooms, and supply air ducts are connected between an air-conditioned room and each of the multiple rooms, that individually distributes and supplies air inside the air-conditioned room to each of the multiple rooms by each of controllers disposed in each of the multiple rooms.

CITATION LISTS

Patent Literatures

PTL1: Unexamined Japanese Patent Application Publication No. 2011-127845.

SUMMARY OF THE DISCLOSURE

Foregoing conventional air conditioning systems, regardless of whether a room is occupied or unoccupied, equalize a specified target temperature. However, there may be practically various cases, where nobody is in the room, multiple rooms are occupied, or only one or another room is occupied. Because of this, it's inefficient to perform an identical temperature control for all rooms in terms of energy efficiency.

As such, the disclosure solves the above-described conventional issue and intends to provide an energy-efficient air conditioning system according to whether the room is occupied or unoccupied and it's the room or a non-room.

The disclosure provides the air conditioning system for performing air conditioning of a house by transferring air conditioned in an air-conditioned room to achieve this object. The air conditioning system includes transfer fans for transferring air into the rooms constituting the house from the air-conditioned room, motion sensors for detecting whether the room is occupied or unoccupied, system controllers for controlling the transfer fans. The system controller includes a target air conditioning environment obtaining section for at least obtaining a target air conditioning environment of the room, an occupied-room/unoccupied-room determining section for determining the room is occupied or unoccupied according to information from the motion sensor, an occupied-room air conditioning environment controlling section for controlling the transfer fan that transfers air to the occupied room to approximate the occupied room to the target air conditioning environment and an unoccupied-room air conditioning environment controlling section for controlling the transfer fan that transfers air to the unoccupied room to approximate the unoccupied room to a quasi-target air conditioning environment where an energy burden is lower than that of the target air conditioning environment. These components achieve an intended object.

This disclosure can provide the air conditioning system to perform an energy-efficient air conditioning control according to whether each of the multiple rooms is occupied or unoccupied and it is the room or the non-room.

BRIEF DESCRIPTION OF DRAWINGS

FIG. 1 is a connection schematic view of an air conditioning system in accordance with a first embodiment of the present disclosure.

FIG. 2 shows an example of room layout of a house in accordance with the first embodiment of the present disclosure.

FIG. 3 is a schematic function block diagram of a system controller of the air conditioning system in accordance with the first embodiment of the present disclosure.

FIG. 4 shows a room temperature distribution of the house in accordance with the first embodiment of the present disclosure.

FIG. 5 is a flow chart showing an air conditioning process in accordance with the first embodiment of the present disclosure.

FIG. 6 shows an example of relationship between an air-conditioned room temperature, a room indoor temperature and a room target temperature in accordance with the first embodiment of the present disclosure.

FIG. 7 is a flow chart showing an air-conditioned room temperature controlling process in accordance with the first embodiment of the present disclosure.

FIG. 8 is a flow chart showing a fan air volume setting process in accordance with the first embodiment of the present disclosure.

FIG. 9 is a flow chart showing a fan air volume adjusting process in accordance with the first embodiment of the present disclosure.

FIG. 10 is a flow chart showing an air-conditioned room load reducing process in accordance with the first embodiment of the present disclosure.

FIG. 11 is a schematic function block diagram of a system controller of an air conditioning system in accordance with a second embodiment of the present disclosure.

FIG. 12 shows an on-screen operation of an input/output terminal in accordance with the second embodiment of the present disclosure.

FIG. 13 is a connection schematic view of the air conditioning system in accordance with a third embodiment of the present disclosure.

FIG. 14 is a schematic function block diagram of the air conditioning system controller of the air conditioning system in accordance with the third embodiment of the present disclosure.

DESCRIPTION OF EMBODIMENTS

Hereinafter, embodiments of the present disclosure will be explained with reference to the accompanying drawings. Note that each of the exemplary embodiments explained hereinafter shows a preferred specific example of the present disclosure. Accordingly, the numerical values, shapes, materials, components, arrangements and connections of the components, steps (processes) and order of the steps indicated in the following exemplary embodiments are merely examples, and therefore do not limit the scope of the present disclosure. Therefore, among the components in the following exemplary embodiments, those not described in any one of the independent claims showing the most significant concepts of the present disclosure are explained as voluntary components. In the drawings, the same symbols are used for the components which are substantially the same each other and the repetitive explanation thereof may be omitted or simplified.

EMBODIMENT

First Embodiment

Firstly, air conditioning system 19 in accordance with a first embodiment of the present disclosure is explained with reference to FIG. 1 and FIG. 2. FIG. 1 is a connection schematic view of air conditioning system 19 in accordance with the first embodiment of the present disclosure and FIG. 2 shows an example of room layout of general residence 1 in accordance with the first embodiment of the present disclosure.

Air conditioning system 19 is configured to include outdoor air introducing fan 4, multiple exhaust fans 5 (5a, 5b, 5c, 5d, 5e, 5f, 5g, 5h and 5i), multiple transfer fans 3 (3a, 3b, 3c, 3d, 3e, 3f, 3g, 3h and 3i), multiple circulation fans 6 (6a, 6b, 6c, 6d, 6e, 6f, 6g, 6h and 6i), room temperature sensors 9 (9a, 9b, 9c, 9d, 9e, 9f, 9g, 9h and 9i), room humidity sensors 10 (10a, 10b, 10c, 10d, 10e, 10f, 10g, 10h and 10i), room motion sensors 11 (11a, 11b, 11c, 11d, 11e, 11f, 11g, 11h and 11i), air-conditioned room temperature sensor 12, air-conditioned room humidity sensor 13, air conditioner 7, humidifier 15, dehumidifier 16, air cleaner 40, input/output terminal 18 and system controller 8a (equal to an air conditioning system controller).

Air conditioning system 19 is installed in general residence 1, which is an example of house. General residence 1 includes multiple (nine in the present exemplary embodiment) rooms 2 (2a, 2b, 2c, 2d, 2e, 2f, 2g, 2h and 2i) and at least one air-conditioned room 17, which is independent from rooms 2a to 2i. General residence 1 (residence) here means one provided as where residents live their private lives and it generally includes a living room, a dining room (kitchen and eating space), bedrooms, storages, children's rooms, and so forth. Rooms served by air conditioning system 19 may be a toilet, a bathroom, a restroom, a dressing room, a hallway, an entrance, and so forth.

In air-conditioned room 17, air transferred from each of rooms 2a to 2i by each of circulation fans 6a to 6i is mixed with each other. The air is also mixed with outdoor air taken therein by outdoor air introducing fan 4. Temperature, humidity and cleanliness of the air of air-conditioned room 17 are suitably controlled by air conditioner 7, humidifier 15, dehumidifier 16 and air cleaner 40, which are disposed in air-conditioned room 17, so that an air conditioning environment in air-conditioned room 17 is optimized to generate air to be transferred to each of rooms 2a to 2i. The air that is air-conditioned in air-conditioned room 17 is transferred to each of rooms 2a to 2i by each of transfer fans 3a to 3i.

The air of each of rooms 2a to 2i is transferred to air-conditioned room 17 by each of circulation fans 6a to 6i and is additionally exhausted as outdoor air by each of exhaust fans 5a to 5i from each of rooms 2a to 2i outside general residence 1. Air conditioning system 19 controls an exhaust volume of each of exhaust fans 5a to 5i to exhaust the outdoor air from each of the rooms, and simultaneously controls an air supply volume of outdoor air introducing fan 4 in association with the exhaust volume of each of the exhaust fans to introduce the outdoor air into each of the rooms, to thereby perform mechanical heat recovery ventilation.

Outdoor air introducing fan 4 takes the outdoor air into the rooms of general residence 1 and is equal to an air supply fan or an air supply function of a heat-exchange ventilation fan. As described above, the outdoor air taken by outdoor air introducing fan 4 is introduced into air-conditioned room 17. Outdoor air introducing fan 4 is configured to be able to set multiple supply air volumes and the air volume is set according to the exhaust volume of each of exhaust fans 5a to 5i as described later.

Each of exhaust fans 5a to 5i exhausts part of the air of each of rooms 2a to 2i outside through an exhaust duct and is equal to a function of a ceiling-embedded ventilation fan, a wall-mounted ventilation fan, a range hood or a heat-exchange ventilation fan. In FIG. 1, the exhaust duct connected to each of exhaust fans 5a to 5i is directly connected outside general residence 1, however, to use the exhaust function of the heat-exchange ventilation fan, the duct is first connected to the heat-exchange ventilation fan, then connected outside general residence 1. That is, air through the exhaust duct is first heat exchanged with air through an air supply duct of the heat-exchange ventilation fan, then exhausted outside general residence 1. Exhaust fan 5a is disposed in room 2a, and equally exhaust fan 5b is disposed in room 2b, exhaust fan 5c is disposed in room 2c, exhaust fan 5d is disposed in room 2d, exhaust fan 5e is disposed in room 2e, exhaust fan 5f is disposed in room 2f, exhaust fan 5g is disposed in room 2g, exhaust fan 5h is disposed in room 2h and exhaust fan 5i is disposed in room 2i.

The exhaust volume of each of exhaust fans 5a to 5i is configured to be able to set multiple exhaust volumes. In normal operation, the exhaust volume of each of exhaust fans 5a to 5i is controlled so as to achieve a previously-set exhaust volume. Additionally the exhaust volume of each of exhaust fans 5a to 5i is also controlled according to an air volume set by a user or obtained by various sensors.

Transfer fans 3a to 3i are disposed, for example, on a wall of air-conditioned room 17 in response to each of rooms 2a to 2i. The air of air-conditioned room 17 is transferred to room 2a by transfer fan 3a through a transfer duct, and it is equally transferred to room 2b by transfer fan 3b, room 2c by transfer fan 3c, room 2d by transfer fan 3d, room 2e by transfer fan 3e, room 2f by transfer fan 3f, room 2g by transfer fan 3g, room 2h by transfer fan 3h and room 2i by transfer fan 3i.

Each of the transfer ducts connected to each of the rooms is installed independent from each other.

Circulation fan 6a is disposed in room 2a, equally circulation fan 6b is disposed in room 2b, circulation fan 6c is disposed in room 2c, circulation fan 6d is disposed in room 2d, circulation fan 6e is disposed in room 2e, circulation fan 6f is disposed in room 2f, circulation fan 6g is disposed in room 2g, circulation fan 6h is disposed in room 2h and circulation fan 6i is disposed in room 2i. Part of the air of each of rooms 2a to 2d is transferred to air-conditioned room 17 by circulation fans 6a to 6i through each of circulation ducts. Each of the circulation ducts connected between air-conditioned room 17 and each of the rooms may be independently installed, however, these separate circulation ducts may be unified into one circulation duct before air-conditioned room 17 and then connected to it.

Air conditioner 7 is equal to an air conditioning controller and controls the air of air-conditioned room 17. Air conditioner 7 cools or heats the air of air-conditioned room 17 so that a temperature of air-conditioned room 17 can reach an air-conditioned room target temperature previously set.

Humidifier 15 humidifies the air of air-conditioned room 17, when a humidity of air-conditioned room 17 is lower than an air-conditioned room target humidity previously set, so as to achieve the air-conditioned room target humidity. Humidifier 15 may be built in air conditioner 7, however, it's desirable to install humidifier 15 independent from air conditioner 7 for obtaining a humidifying capacity enough to humidify each of rooms 2a to 2i.

Dehumidifier 16 dehumidifies the air of air-conditioned room 17, when the humidity of air-conditioned room 17 is higher than the air-conditioned room target humidity previously set, so as to achieve the air-conditioned room target humidity. Dehumidifier 16 may be built in air conditioner 7, however, it's desirable to install dehumidifier 16 independent from air conditioner 7 for obtaining a dehumidifying capacity enough to dehumidify each of rooms 2a to 2i.

Air cleaner 40 cleans the air of air-conditioned room 17, when a cleanliness of air-conditioned room 17 is higher than an air-conditioned room target cleanliness previously set, so as to achieve the air-conditioned room target cleanliness. Air cleaner 40 may be built in air conditioner 7, however, it's desirable to install air cleaner 40 independent from air conditioner 7 for obtaining a cleaning capacity enough to clean each of rooms 2a to 2i.

Room temperature sensor 9a is disposed in room 2a, equally room temperature sensor 9b is disposed in room 2b, temperature sensor 9c is disposed in room 2c, temperature sensor 9d is disposed in room 2d, temperature sensor 9e is disposed in room 2e, temperature sensor 9f is disposed in room 2f, temperature sensor 9g is disposed in room 2g, temperature sensor 9h is disposed in room 2h and temperature sensor 9i is disposed in room 2i. Each of room temperature sensors 9a to 9i obtains each of indoor temperature of rooms 2a to 2i to transmit it to system controller 8a.

Room humidity sensor 10a is disposed in room 2a, equally room humidity sensor 10b is disposed in room 2b, room humidity sensor 10c is disposed in room 2c, room humidity sensor 10d is disposed in room 2d, room humidity sensor 10e is disposed in room 2e, room humidity sensor 10f is disposed in room 2f, room humidity sensor 10g is disposed in room 2g, room humidity sensor 10h is disposed in room 2h and room humidity sensor 10i is disposed in room 2i. Each of room humidity sensors 10a to 10i obtains each of indoor humidity of rooms 2a to 2i to transmit it to system controller 8a.

Room motion sensor 11a is disposed in room 2a, equally room motion sensor lib is disposed in room 2b, room motion sensor 11c is disposed in room 2c, room motion sensor 11d is disposed in room 2d, room motion sensor lie is disposed in room 2e, room motion sensor 11f is disposed in room 2f, room motion sensor 11g is disposed in room 2g, room motion sensor 11h is disposed in room 2h and room motion sensor 11i is disposed in room 2i. Each of room motion sensors 11a to 11i obtains an occupancy/unoccupancy information of each of rooms 2a to 2i to transmit it to system controller 8a. Room motion sensor 11 may be in any form if it is a device to detect whether each of rooms 2a to 2i is occupied or unoccupied. That is, room motion sensor 11, for example, is equal to an infrared radiation sensor, an image sensor, a carbon dioxide sensor and others, which directly detect whether room 2 is occupied or unoccupied. However, their accuracy and property are different each other, therefore, they may be used according to purpose. For example, a communicator used in proximity wireless communication is equal to room motion sensor 11 in this application when an occupancy/unoccupancy in room 2 is determined through a communication between a mobile communication terminal and the communicator installed in room 2.

Air-conditioned room temperature sensor 12 obtains the temperature of air-conditioned room 17 to transmit it to system controller 8a. Air-conditioned room temperature sensor 12 may be built in air conditioner 7, however, in that case, it can obtain only information around air conditioner 7 (for example, information around an air supply inlet). As described above, the outdoor air and the air transferred from rooms 2a to 2i are mixed in air-conditioned room 17, therefore, it's desirable to install it independent from air conditioner 7 so as to obtain whole information on air-conditioned room 17.

Air-conditioned room humidity sensor 13 obtains the humidity of air-conditioned room 17 to transmit it to system controller 8a. For the same reason as that for air-conditioned room temperature sensor 12, it's desirable to install it independent from air conditioner 7 so as to obtain whole information on air-conditioned room 17.

System controller 8a controls overall air conditioning system 19. System controller 8a is wirelessly connected in such a way as to be able to communicate with outdoor introducing fan 4, exhaust fans 5a to 5i, transfer fans 3a to 3i, circulation fans 6a to 6i, room temperature sensors 9a to 9i, room humidity sensors 10a to 10i, room motion sensors 11a to 11i, air-conditioned room temperature sensor 12, air-conditioned room humidity sensor 13, air conditioner 7, humidifier 15, dehumidifier 16 and air cleaner 40.

System controller 8a controls outdoor air introducing fan 4 and exhaust fans 5a to 5i in association with each other. For example, system controller 8a may set the air supply volume of outdoor air introducing fan 4 according to the exhaust volume of each of exhaust fans 5a to 5i. This makes it possible to provide mechanical heat recovery ventilation for general residence 1.

In addition, system controller 8a controls air conditioner 7, humidifier 15 and dehumidifier 16 as the air-controlling controller according to the temperature and humidity of air-conditioned room 17 obtained by air-conditioned room temperature sensor 12 and air-conditioned room humidity sensor 13 such that at least one of the temperature and the humidity of air-conditioned room 17 can be at least one of the target temperature and the target humidity previously set to air-conditioned room 17. System controller 8a also controls air cleaner 40 as the air conditioning controller such that air-conditioned room 17 can be a target air conditioning environment cleanliness previously set to air-conditioned room 17.

Moreover, system controller 8a determines whether each of rooms 2a to 2i is occupied or unoccupied according to occupancy/unoccupancy information on each of rooms 2a to 2i obtained by each of room motion sensors 11a to 11i.

Then, system controller 8a sets the air volume of each of transfer fans 3a to 3i and the air volume of each of circulation fans 6a to 6i according to the indoor temperature and the indoor humidity of each of rooms 2a to 2i obtained by each of room temperature sensors 9a to 9i and each of room humidity sensor 10a to 10i, a target air conditioning temperature, a target air conditioning humidity and the like set to the occupied room.

Moreover, system controller 8a sets the air volume of each of transfer fans 3a to 3i and the air volume of each of circulation fans 6a to 6i according to the indoor temperature and the indoor humidity of each of rooms 2a to 2i obtained by each of room temperature sensors 9a to 9i and each of room humidity sensors 10a to 10i, a quasi-target air conditioning temperature, a quasi-target air conditioning humidity and the like set to the unoccupied room.

Thus, the air conditioned in air-conditioned room 17 is transferred to each of rooms 2a to 2i at the air volume set to each of transfer fans 3a to 3i and the air of each of rooms 2a to 2i is transferred to air-conditioned room 17 at the air volume set to each of circulation fans 6a to 6i. Therefore, at least one of the indoor temperature, the indoor humidity and the cleanliness of each of rooms 2a to 2i is controlled so as to be at least one of the target air conditioning temperature, the target air conditioning humidity and the target air conditioning cleanliness.

A process of above-described system controller 8a is detailed hereinafter.

Here, no complicated wiring is required by connecting system controller 8a with outdoor air introducing fan 4, exhaust fans 5a to 5i, transfer fans 3a to 3i, circulation fans 6a to 6i, room temperature sensors 9a to 9i, room humidity sensors 10a to 10i, room motion sensors 11a to 11i, air-conditioned room temperature sensor 12, air-conditioned room humidity sensor 13, air conditioner 7, humidifier 15 and dehumidifier 16 and air cleaner 40 using wireless communication. On the other hand, it is also possible that all of these components, or system controller 8a and a part of them, may be configured to communicate with each other by wired communication.

Input/output terminal 18 is connected in such a way to be able to communicate with system controller 8a by wireless communication. Input/output terminal 18 receives information required to construct air conditioning system 19 to store it on system controller 8a or displays a status of air conditioning system 19 obtained from system controller 8a. An example of input/output terminal 18 is a portable information terminal such as a mobile phone, a smart phone, or a tablet.

Input/output terminal 18 may not always be connected to system controller 8a by the wireless communication, therefore, it may be connected to system controller 8a to be able to communicate with each other by the wired communication. In this case, for example, input/output terminal 18 may be a wall-mounted remote controller.

Next, functions of system controller 8a are explained with reference to FIG. 3. FIG. 3 is a schematic function block diagram of system controller 8a.

System controller 8a includes air-conditioned room temperature controlling section 23, air volume determining section 24a, fan air volume controlling section 20, total air volume calculating section 25, air volume comparing section 26 and storing section 30.

Air-conditioned room temperature controlling section 23 controls air conditioner 7 as the air conditioning controller so that a temperature of air-conditioned room 17 (air-conditioned room temperature) can be equivalent to a target air conditioning environment (temperature) or less obtained by target air conditioning environment obtaining section 33a during a cooling period when the indoor temperature (room inside temperature) of room 2 is high and air conditioner 7 provides cooling operation. Air-conditioned room temperature controlling section 23 controls air conditioner 7 so that the temperature of air-conditioned room 17 (air-conditioned room temperature) can be equivalent to the target air conditioning environment (temperature) or over obtained by target air conditioning environment obtaining section 33a during a heating period when the indoor temperature of room 2 is low and air conditioner 7 provides heating operation.

Air volume determining section 24a includes occupied-room/unoccupied-room determining section 32, target air conditioning environment obtaining section 33a, quasi-target air conditioning environment storing section 34a, occupied-room air conditioning environment controlling section 21, unoccupied-room air conditioning environment controlling section 22, first temperature comparing section 27, second temperature comparing section 28 and temperature difference comparing section 29.

Occupied-room/unoccupied-room determining section 32 determines whether each of rooms 2a to 2i is occupied or unoccupied according to the information obtained from each of room motion sensors 11a to 11i. Each of room motion sensors 11a to 11i itself may determine the occupancy/unoccupancy to transmit a signal indicating a determination to occupied-room/unoccupied-room determining section 32 or occupied-room/unoccupied-room determining section 32 may determine the occupancy/unoccupancy according to the signal transmitted from each of room motion sensors 11a to 11i.

When room 2 is determined as being occupied by occupied-room/unoccupied-room determining section 32, target air conditioning environment obtaining section 33a obtains the target air conditioning environment (temperature) previously set to occupied room 2 through input/output terminal 18.

Occupied-room air conditioning environment controlling section 21 determines the air volume of transfer fan 3 of the occupied room according to the target air conditioning environment (temperature) obtained by target air conditioning environment obtaining section 33a, the temperature of air-conditioned room 17 controlled by air-conditioned room temperature controlling section 23 and the indoor temperature of the occupied room obtained by room temperature sensor 9.

Quasi-target air conditioning environment storing section 34a associates an adjacent spatial distance between the occupied room and the unoccupied room with a quasi-target air conditioning environment (temperature) corresponding to the adjacent spatial distance.

Here, the adjacent spatial distance means a distance between the occupied room and the unoccupied room. However, given that a room is considered as one space, the distance does not mean a linear one, but a value indicating how much spaces exist between the occupied room and the unoccupied room. For example, the adjacent spatial distance is one (1) for an adjacent room where it is adjacent to the occupied room across an accessible door. The adjacent spatial distance is not one (1) for the adjacent room where it is not directly accessible to the occupied room even if it is adjacent to the occupied room. The adjacent spatial distance is two (2) for a room where it is connected with the occupied room through an accessible hallway. A specific example is subsequently given with reference to FIG. 2. When room 2a is occupied and rooms 2b to 2i are unoccupied, the adjacent spatial distance is one (1) for room 2c, two (2) for room 2b, 2d, 2e and 2h and three (3) for room 2f, 2g and 2i. And when room 2a and room 2i are occupied and rooms other than these are unoccupied, the adjacent spatial distance is one (1) for room 2c and room 2h and two (2) for room 2b, 2d, 2e, 2g and 2f.

The quasi-target air conditioning environment means an air conditioning environment where an energy burden is lower than that of the target air conditioning environment. Here, the air conditioning environment with the lower energy burden is explained taking the temperature as an example. During summer, that is, the cooling period, given that the target air conditioning environment (temperature) of the occupied room is set to 24 degrees C. In this case, the quasi-target air conditioning environment (temperature) is higher than 24 degrees C., that is, an environment where air conditioner 7 consumes less electric power, for example, 26 degrees C. During winter, that is, the heating period, given that the target air conditioning environment (temperature) of the occupied room is set to 22 degrees C. In this case, the quasi-target air conditioning environment (temperature) is lower than 22 degrees C., that is, the air conditioning environment where air conditioner 7 consumes less electric power, for example, 20 degrees C.

The quasi-target air conditioning environment is explained taking the temperature as the example in the above. For the humidity, in an environment requiring dehumidification during a rainy season, the quasi-target air conditioning environment (humidity) means an environment where the humidity is set to be higher than that in the target air conditioning environment (humidity), and the quasi-target air conditioning environment (humidity) means an environment where the humidity is set to be lower than that in the target air conditioning environment (humidity) during a dry season. For the cleanliness, the quasi-target air conditioning environment (cleanliness) is an environment where the cleanliness is set to be higher than that in the target air conditioning environment (cleanliness).

A setting example of the target air conditioning environment (temperature) and the quasi-target air conditioning environment (temperature) of the room is indicated below according to information stored in quasi-target air conditioning environment storing section 34a.

During summer, that is, the cooling period, quasi-target air conditioning environment storing section 34a stores the quasi-target air conditioning environment (temperature) 2 degrees C. higher than the target air conditioning environment (temperature) when the adjacent spatial distance is one (1) between the occupied room and the unoccupied room. When the adjacent spatial distance is two (2) between the same, quasi-target air conditioning environment storing section 34a stores the quasi-target air conditioning environment (temperature) 4 degrees C. higher than the target air conditioning environment (temperature). When the adjacent spatial distance is three (3) between the same, quasi-target air conditioning environment storing section 34a stores the quasi-target air conditioning environment (temperature) 6 degrees C. higher than the target air conditioning environment (temperature). Considering where all of rooms 2a to 2i are unoccupied or the adjacent spatial distance between the occupied room and the unoccupied room is significantly large, for example, 4 or over, quasi-target air conditioning environment storing section 34a stores the quasi-target air conditioning environment (temperature) up to 8 degrees C. higher than the target air conditioning environment (temperature) during the cooling period.

Similarly, during winter, that is, the heating period, quasi-target air conditioning environment storing section 34a stores the quasi-target air conditioning environment (temperature) 2 degrees C. lower than the target air conditioning environment (temperature) when the adjacent spatial distance is one (1) between the occupied room and the unoccupied room. When the adjacent spatial distance is two (2) between the same, quasi-target air conditioning environment storing section 34a stores the quasi-target air conditioning environment (temperature) 4 degrees C. lower than the target air conditioning environment (temperature). When the adjacent spatial distance is three (3) between the same, quasi-target air conditioning environment storing section 34a stores the quasi-target air conditioning environment (temperature) 6 degrees C. lower than the target air conditioning environment (temperature). Considering where all of rooms 2a to 2i are unoccupied or the adjacent spatial distance between the occupied room and the unoccupied room is significantly large, for example, 4 or over, quasi-target air conditioning environment storing section 34a stores the quasi-target air conditioning environment (temperature) up to 8 degrees C. lower than the target air conditioning environment (temperature) during the heating period.

For example, in FIG. 2, given that room 2a is occupied and rooms 2b to 2i are unoccupied during summer, that is, the cooling period, where the target air conditioning environment (temperature) is 20 degrees C. for room 2a, the quasi-target air conditioning environment (temperature) is 22 degrees C. for rooms 2b and 2c because the adjacent spatial distance is one (1), the quasi-target air conditioning environment (temperature) is 24 degrees C. for rooms 2d, 2e and 2h because the adjacent spatial distance is two (2) and the quasi-target air conditioning environment (temperature) is 26 degrees C. for rooms 2f, 2g and 2i because the adjacent spatial distance is three (3). FIG. 4 indicates a temperature distribution diagram where room 2a is occupied and rooms 2b to 2i are unoccupied during summer, that is, the cooling period, and the same concentration means the same temperature.

Unoccupied-room air conditioning environment controlling section 22 determines the air volume of transfer fan 3 of the unoccupied room according to the quasi-target air conditioning environment (temperature) determined by information from target air conditioning environment obtaining section 33a and quasi-target air conditioning environment storing section 34a, the temperature of air-conditioned room 17 controlled by air-conditioned room temperature controlling section 23 and the indoor temperature of the unoccupied room obtained by room temperature sensor 9. A procedure to determine or modify the air volume is explained hereinafter.

First temperature comparing section 27 calculates a temperature difference between the target air conditioning temperature obtained by target air conditioning environment obtaining section 33a and the temperature of the air-conditioned room detected by air-conditioned room sensor 12 per occupied room. First temperature comparing section 27 also calculates a temperature difference between the quasi-target air conditioning temperature determined through quasi-target air conditioning environment storing section 34a and the temperature of the air-conditioned room detected by air-conditioned room sensor 12 per unoccupied room.

Second temperature comparing section 28 calculates a temperature difference between the target air conditioning temperature obtained by target air conditioning environment obtaining section 33a and the indoor temperature of the occupied room detected by room temperature sensor 9 per occupied room. Second temperature comparing section 28 also calculates a temperature difference between the quasi-target air conditioning temperature determined through quasi-target air conditioning environment storing section 34a and the indoor temperature of the unoccupied room detected by room temperature sensor 9 per unoccupied room.

Temperature difference comparing section 29 compares a temperature difference A calculated by second temperature comparing section 28 at a specified timing A with a temperature difference B calculated by second temperature comparing section 28 at a timing B lapsed after a given time from the specified timing A. The timing A can be reworded as a specified time and the timing B as a time when the given time lapses from the specified time.

Fan air volume controlling section 20 controls the air volume of each of transfer fans 3a to 3i to be the air volume determined by air-volume determining section 24a for each of rooms 2a to 2i. Fan air volume controlling section 20 may also control the air volume of each of circulation fans 6a to 6i, however, the detailed explanation is omitted here.

Total air volume calculating section 25 calculates a total air volume, which is a sum of the air volume of each of transfer fans 3a to 3i. Here, the sum of the air volume is indicated as the sum of the air volume of each of transfer fans 3a to 3i per unit time.

Air volume comparing section 26 compares the total air volume calculated by total air volume calculating section 25 with a specified threshold value of the air volume. Here the specified threshold value of the air volume may be, for example, a sum of maximum air volume of each of transfer fans 3a to 3i, or 70% to 95% of the sum of the maximum air volume.

Storing section 30 is, so called, a memory which stores the specified threshold value of the air volume previously set. Storing section 30 is also used when a control by system controller 8 requires information such as numerical values to be stored.

Next, an air conditioning process executed by system controller 8a is explained with reference from FIG. 5 through FIG. 10. FIG. 5 is a flow chart showing the air conditioning process. FIG. 6 an example of relationship between the temperature of the air-conditioned room, a room indoor temperature and the target (quasi-target) air conditioning temperature. FIG. 7 is a flow chart showing an air-conditioned room temperature control process. FIG. 8 is a flow chart showing a fan air volume setting process. FIG. 9 is a flow chart showing a fan air volume adjusting process. FIG. 10 is a flow chart showing an air-conditioned room load reduction process.

The air conditioning process executed by system controller 8a, as indicated in FIG. 5, mainly includes air-conditioned room temperature control process S100, fan air volume setting process S200 and fan air volume adjusting process S300, and these processes are executed in this order.

When the user executes the air conditioning process, system controller 8a firstly executes air-conditioned room temperature control process S100 indicated in FIG. 7. In air-conditioned room temperature control process S100, system controller 8a obtains a heating/cooling period setting set by input/output terminal 18 (S101). Here, in the heating/cooling period setting, for example, the cooling period is set in summer when a temperature is high and air conditioner 7 operates as a cooler, and the heating period is set in winter when a temperature is low and air conditioner 7 operates as a heater. For example, the user sets a duration from June to September as the cooling period, and another duration from December to March as the heating period to a calendar function of input/output terminal 18, thus system controller 8a can obtain either the cooling period setting or the heating period setting.

Then, system controller 8a obtains the target air conditioning temperature set to the occupied room by input/output terminal 18 through target air conditioning environment obtaining section 33a (S102).

After system controller 8a obtains the target air conditioning temperature, then air-conditioned room temperature controlling section 23 sets the target temperature of air-conditioned room 17 (the target air conditioning temperature of the air-conditioned room) to air conditioner 7 (S103). It is specifically set as described below.

FIG. 6 illustrates each temperature environment in air-conditioned room 17, occupied room 2d, unoccupied room 2c and unoccupied room 2b. The cooling period is taken as an example here. In occupied room 2d, the indoor temperature is 27 degrees C. and the target air conditioning temperature is 20 degrees C. In unoccupied room 2c, the indoor temperature is 27 degrees C., and the quasi-target air conditioning temperature is 22 degrees C. because the adjacent spatial distance from occupied room 2d is one (1). In unoccupied room 2b, the indoor temperature is 28 degrees C., and the quasi-target air conditioning temperature is 24 degrees C. because the adjacent spatial distance from occupied room 2d is two (2). Here, the heating/cooling period setting is obtained as the cooling period according to the process of S101, that is, the cooling operation is provided. Therefore air-conditioned room temperature controlling section 23 controls the target air conditioning temperature of the air-conditioned room to be equal to or less than the target air conditioning temperature. As indicated in the example of FIG. 6, the target air conditioning temperature of the air-conditioned room is set to 20 degrees C. or less. The target air conditioning temperature of the air-conditioned room is 20 degrees C. here.

During the heating period, that is, the heating operation is provided, air-conditioned room temperature controlling section 23 controls the target air conditioning temperature of the air-conditioned room to be equal to or higher than the target air conditioning temperature. Although no example is taken as indicated in FIG. 6 here, the target air conditioning temperature is 24 degrees C. during the heating period, for example.

According to the above setting, air-conditioned room 17 is cooled to 20 degrees C., which is the setting temperature, this target air conditioning temperature of the air-conditioned room satisfies the target air conditioning temperature of each of rooms 2b, 2c and 2d (between 20 and 24 degrees C. here).

Next, system controller 8a executes fan air volume setting process S200 as indicated in FIG. 8. In fan air volume setting process S200, system controller 8a obtains the temperature of the air-conditioned room through air-conditioned room temperature sensor 12 (S201). Subsequently, system controller 8a obtains the indoor temperature of each of rooms 2a to 2i through each of room temperature sensors 9a to 9i (S202). Then, system controller 8a determines whether each of rooms 2a to 2i is occupied or unoccupied through occupied-room/unoccupied-room determining section 32 (S203). Additionally, system controller 8a, when the room is determined as being occupied, obtains the target air conditioning temperature of the occupied room set by input/output terminal 18 through target air conditioning environment obtaining section 33a, and when the room is determined as being unoccupied, it also obtains the quasi-target air conditioning temperature of the unoccupied room obtained by quasi-target air conditioning environment storing section 34a according to the information from target air conditioning environment obtaining section 33a (S204).

After the above process is completed, first temperature comparing section 27 compares the target (quasi-target) air conditioning temperature with the temperature of the air-conditioned room to calculate the temperature difference (S205).

After first temperature comparing section 27 calculates the temperature difference, air volume determining section

24a determines the air volume of each of transfer fans 3a to 3i according to the calculated temperature difference (S206).

The air volume is specifically determined as described below. That is, because the target air conditioning temperature of occupied room 2d is 20 degrees C. and the temperature of air-conditioned room 18 after conditioned is 20 degrees C., the air volume of transfer fan 3c passing through the transfer duct connected between occupied room 2d and air-conditioned room 17 is made maximum. Here, the air volume can be considered as a transfer fan capacity or an operating notch. For example, given that the air volume of transfer fan 3 can be set in ascending (volume) order between Air Volume 1 and Air Volume 10, the air volume is determined as Air Volume 10 here. That is, air volume determining section 24a determines to transfer a maximum air volume of the same temperature as air-conditioned room 17 (20 degrees C.) to reduce the indoor temperature of occupied room 2d from 27 degrees C. and further maintain the target air conditioning temperature of 20 degrees C.

Because the quasi-target air conditioning temperature of unoccupied room 2c with the adjacent spatial distance of one (1) is 22 degrees C. and the temperature of air-conditioned room 17 after conditioned is 20 degrees C., for example, given that the air volume of transfer fan 3b is Air Volume 10 (maximum), the quasi-target air conditioning temperature of unoccupied room 2c may be below 22 degrees C. Therefore, air volume determining section 24a determines the air volume of transfer fan 3b to be below the maximum value, that is, Volume 8, for example.

Similarly, because the quasi-target air conditioning temperature of unoccupied room 2b with the adjacent spatial distance of two (2) is 24 degrees C. and the temperature of air-conditioned room 17 after conditioned is 20 degrees C., for example, given that the air volume of transfer fan 3a is Air Volume 10 (maximum), the quasi-target air conditioning temperature of unoccupied room 2b may be below 24 degrees C. Therefore, air volume determining section 24a determines the air volume of transfer fan 3a to be below the maximum value, that is, Volume 6, for example.

That is, air volume determining section 24a, according to the temperature difference between the target (quasi-target) air conditioning temperature and the temperature of the air-conditioned room, determines the air volume of transfer fan 3 of the room where the temperature difference calculated by first temperature comparing section 27 is small (for example, occupied room 2d: temperature difference of 0 degree C.) more than the air volume of transfer fan 3 of the room where the temperature difference is large (for example, unoccupied room 2b: temperature difference of 5 degrees C., unoccupied room 2c: temperature difference of 2 degrees C.).

The above process is executed to all the rooms (No for S207→S202, Yes for S207).

Fan air volume controlling section 20 controls the air volume of each of transfer fans 3a to 3i according to the air volume of each of transfer fans 3a to 3i determined by air volume determining section 24a.

Thus, it makes possible to control the occupied room to be the target air conditioning temperature and the unoccupied room to be the quasi-target air conditioning temperature through the temperature of the air-conditioned room controlled by air-conditioned room temperature controlling section 23 and separate control of each of transfer fans 3a to 3i.

The above process can provide the user-desired, that is, most comfortable target air conditioning environment in the occupied room and the quasi-target air conditioning environment with the lower energy burden in the unoccupied room. Thus, compared to an energy burden where the target air conditioning environment is set to each of the rooms, it can be lowered. And that, even if an occupant moves from the occupied room to the unoccupied room, the occupant is unaffected by a change in the air conditioning environment. Therefore, an adverse effect brought by a sudden environmental change, for example, a shock from the temperature change, can be controlled.

In addition, the unoccupied room is provided with the air conditioning environment where the energy burden is gradationally lowered according to the adjacent spatial distance from the occupied room. Thus, even if the occupant moves over multiple spaces, the environment gradually changes. Therefore, it's easy for the occupant to accept the environment, and the adverse effect associated with environment change can be reduced.

Based on the above process, when the occupant moves to an unoccupied room, the unoccupied room becomes an occupied room, and additionally the occupied room becomes the unoccupied room. Therefore, the target air conditioning environment of the former occupied room is set to the newly-occupied room, then, the most comfortable environment can be provided. As the quasi-target air conditioning environment with the lower energy burden is set to the former occupied room, it makes possible to maintain the environment with the lower energy burden all over the house.

Regardless of the temperature difference between the room indoor temperature and the target (quasi-target) temperature, it is also possible to quickly achieve the target (quasi-target) temperature by transferring the maximum air volume first to a room where the target (quasi-target) temperature is not achieved. Again, after-described fan air volume adjusting process S300 can also maintain each of the rooms at the target (quasi-target) temperature. However, as a large air volume is transferred to multiple rooms 2 from air-conditioned room 17 at one time, the air in air-conditioned room 17 is not be cooled or heated enough, eventually a cooling and heating effect may be reduced. This is the case when the air conditioning system starts any process or the target air conditioning environment is simultaneously set to each of the rooms after all family occupants come home. To cope with this problem, a volume of the air-conditioned room may be increased, however, this not only increases a space cost but also requires a large capacity of air-conditioner. While on the other hand, air volume determining section 24a determines the air volume of the transfer fan of the room where the temperature difference is small more than that of the room where the temperature difference is large. In other words, air volume determining section 24a determines the air volume of the transfer fan of the room where the temperature difference is large less than that of the room where the temperature difference is small. Thus, the indoor temperature of each of the rooms can be gradually reduced to the target (quasi-target) air conditioning temperature to control a reduction in the cooling and heating effect and downsize the air-conditioned room as a result.

By the way, in the above setting, as the target air conditioning temperature of occupied-room 2d is the same as that of air-conditioned room 17, occupied-room 2d can be controlled to be at the target air conditioning temperature by controlling transfer fan 3c to transfer the maximum air volume. However, as the quasi-target air conditioning temperature of unoccupied-room 2b is 24 degrees C., where the air volume is Air Volume 5 in the above example, it is not clear whether the quasi-target air conditioning temperature can be achieved, the achieved quasi-target air conditioning temperature can be maintained or unoccupied-room 2b is overcooled. It is the same in unoccupied-room 2c. To cope with a case like this, system controller 8a executes fan air volume adjusting process S300 indicated in FIG. 9. In fan air volume adjusting process S300, system controller 8a determines whether or not the given time lapses after fan air volume setting process S200 is completed (S301). When it does not lapse, system controller 8a waits until it lapses (No for S301). This intends to operate the air conditioning system in an environment set by fan air volume setting process S200 and secure a time to approximate the indoor temperature of each of the rooms to the target air conditioning temperature.

After the given time lapses, system controller 8a obtains the indoor temperature of each of the rooms through each of room temperature sensors 9a to 9i (S302). In addition, system controller 8a determines whether each of rooms 2a to 2i is occupied or unoccupied through occupied-room/unoccupied-room determining section 32 (S303). Then, system controller 8a, when the room is determined as being occupied, obtains the target air conditioning temperature of the occupied room set by input/output terminal 18 through target air conditioning environment obtaining section 33a, and when the room is determined as being unoccupied, it also obtains the quasi-target air conditioning temperature of the unoccupied room obtained by quasi-target air conditioning environment storing section 34a according to the information from target air conditioning environment obtaining section 33a (S304).

After the above process is completed, second temperature comparing section 28 compares the target (quasi-target) air conditioning temperature with the indoor temperature of the room to calculate the temperature difference (temperature divergence) (S305).

After second temperature comparing section 28 calculates the temperature difference, temperature difference comparing section 29 compares it with the temperature difference A. The temperature difference A is calculated by second temperature comparing section 28 at a previous timing (equal to the timing A) and stored in fan air volume adjusting process S300 previously executed. As this is the first process, the temperature difference A previously calculated does not exist, therefore no comparison is provided. The calculated temperature difference is stored in storing section 30 as the temperature difference A, and then system controller 8a returns to S301.

When the temperature difference A calculated at the previous timing (equal to the timing A) exists, temperature difference comparing section 29 compares the temperature difference B calculated by second temperature comparing section 28 at this timing (equal to the timing B) with the temperature difference A at the timing A stored in storing section 30.

Here, when the indoor temperature of the room is close to the target (quasi-target) air conditioning temperature after a lapse of time from the timing A to the timing B, that is, the temperature difference B is smaller than the temperature difference A, it means that the indoor temperature of the room is close to the target (quasi-target) air conditioning temperature by operation of transfer fan 3. Therefore, air volume determining section 24a determines to reduce the air volume of transfer fan 3 (Yes for S306→S307).

And, when no change is observed in the temperature difference between the indoor temperature of the room and the target (quasi-target) air conditioning temperature or the temperature difference between them gets larger after the lapse of time from the timing A to the timing B, that is, the temperature difference B is larger than the temperature difference A, system controller 8a determines whether it is an overcooling (for the cooling period) or an overheating (for the heating period) (S308). That is, when the temperature difference gets larger, it may be that a cooling (a heating) beyond the target (quasi-target) air conditioning temperature is provided because the air volume of transfer fan 3 is too large (excessive process), or that the indoor temperature of the room does not approximate the target (quasi-target) air conditioning temperature because the air volume of transfer fan 3 is too small, in addition, the indoor temperature of the room is far from the target (quasi-target) air conditioning temperature due to being affected by an outdoor air. Therefore, system controller 8a determines which situation is true in S308.

Here, when determined as being the overcooling or the overheating, that is, the excessive process, air volume determining section 24a determines to reduce the air volume of the transfer fan (Yes for S308→S307).

When determined as being neither the overcooling nor the overheating, that is, not the excessive process, air volume determining section 24a determines to increase the air volume of the transfer fan (No for S308→S309).

Whether or not it is the overcooling or the overheating, that is, it is the excessive process or not, can be determined from the heating/cooling period setting, the target (quasi-target) air conditioning temperature and the indoor temperature of the room.

Though not indicated in FIG. 9, when there is no difference between the indoor temperature of the room and the target (quasi-target) air conditioning temperature, or the indoor temperature of the room is close to the target (quasi-target) air conditioning temperature (plus or minus 0.3 degrees C., for example), after the lapse of time from the timing A to the timing B, the air volume of the transfer fan may not be changed and it may be maintained.

Fan air volume adjusting process S300 described above is regularly executed.

Through fan air volume adjusting process S300 described above, it makes possible to achieve the target (quasi-target) air conditioning temperature in each of rooms 2a to 2i and maintain it by controlling the temperature of the air-conditioned room through air-conditioned room temperature controlling section 23 and controlling the air volume of transfer fan 3.

Air-conditioned room 17 particularly has a significant temperature change because air of various temperatures from each of the rooms is introduced into air-conditioned room 17 by each of the circulation fans. Therefore, for example, it is difficult to provide the above-described control by a system using a pressure difference and a damper, consequently it is important to use transfer fan 3. Although a general fan can be used as the transfer fan to control the temperature in the above-described process, it is desirable, also to provide a fine temperature control, to use a fan equipped with an air volume constant control function as the transfer fan, which is capable of maintaining a certain amount of air volume previously set without being affected by a duct length or pressure.

Even if an interrupt process is executed, for example, changing the target air conditioning temperatures or switching the heating/cooling period settings, the above-described air conditioning process can be executed by starting air-conditioned room temperature control process S100.

By the way, air-conditioned room 17 is a limited volume of space, when it's required to simultaneously cool or heat each of rooms 2a to 2i at the maximum air volume (Air Volume 10) for example, it is difficult to applicably maintain the temperature of air-conditioned room 17. This is because a temperature-adjusted air frequently outflows from air-conditioned room 17, while on the contrary, air of a temperature far from that set to air-conditioned room 17 frequently flows into air-conditioned room 17.

Thus, to cope with a case like this, system controller 8a may execute air-conditioned room load reduction process S400 indicated in FIG. 10. In air-conditioned room load reduction process S400, total air volume calculating section 25 calculates the total air volume, which is the sum of the air volume of each of transfer fans 3a to 3i (S401). Then, air volume comparing section 26 compares the total air volume (the sum of the air volume) calculated by total air volume calculating section 25 with the specified threshold value of the air volume previously stored in storing section 30 (S402). Here, the specified threshold value of the air volume is, for example, 80% of the sum of the maximum air volume of each of transfer fans 3a to 3i.

Here, when the sum of the air volume exceeds the specified threshold value of the air volume (Yes for S403), air volume comparing section 26 additionally determines whether it is the cooling period or the heating period according to the heating/cooling period setting set by input/output terminal 18 (S404). Air volume comparing section 26 transmits that the sum of the air volume exceeds the specified threshold value of the air volume and that it is the cooling period or the heating period to air-conditioned room temperature controlling section 23. If the sum of the air volume is not greater than the specified threshold value of the air volume (No for S403), the process is terminated.

After air-conditioned room temperature controlling section 23 receives that the sum of the air volume exceeds the specified threshold value of the air volume and that it is the cooling period or the heating period, it changes the temperature of the air-conditioned room to be lower than a currently-set temperature for the cooling period (cooling period for S404→S406). Air-conditioned room temperature controlling section 23 changes the temperature of the air-conditioned room to be higher than the currently-set temperature for the heating period (heating period for S404→S405)

Air-conditioned room temperature controlling section 23 transmits that the temperature of the air-conditioned room is changed to air volume determining section 24a. According to this, air volume determining section 24a determines to reduce the air volume of transfer fan 3 (S407).

Thus, a wide temperature range of the target (quasi-target) air conditioning temperature can be provided without increasing the limited volume of air-conditioned room 17 by changing the temperature of air-conditioned room 17 to be lower (cooling period) or to be higher (heating period).

It is advantageous in terms of use efficiency and energy consumption of air-conditioned room 17, not to fix, but to increase a range of reduction (cooling period) or increase (heating period) of the temperature of the air-conditioned room in proportion to how much the sum of the air volume exceeds the specified threshold value of the air volume. Specifically, when the specified threshold value of the air volume is 70 and the sum of the air volume is 80, the temperature is changed by 2 degrees C. Similarly, the temperature is changed by 4 degrees C. for the sum of the air volume of 90, and the temperature is changed by 6 degrees C. for the sum of the air volume of 100.

The air conditioning system and the system controllers in accordance with the present disclosure are explained hereinbefore, the above-described embodiments are only examples, not limited thereto.

For example, circulation fan 6a to 6i and transfer fan 3a to 3i are communicated with each other by ducts connecting the rooms and the air-conditioned room. However, circulation fan 6a to 6i are not necessarily connected by the ducts, a space such as a hallway between the rooms can be also considered as the duct. In this case, the air in the rooms is transferred to the hallway from the rooms by circulation fan 6a to 6i. The air of the hallway transferred from the rooms is introduced into air-conditioned room 17 communicated with the hallway. The air may be introduced into air-conditioned room 17 by separately installing a circulation fan on the hallway wall adjacent to air-conditioned room 17 or by depressurization of air-conditioned room 17 without using the circulation fan. This configuration is expected to reduce efficiency in air circulation compared to the duct connection described above, however it can also contribute to the air conditioning system.

The room referred in the embodiments described above is not necessarily required to be occupied, and it may be considered as one space. That is, a hallway or kitchen may be also considered as one space equal to the room if it is mostly enclosed by something.

And, the air conditioning system in accordance with the present disclosure is applicable to a single-family house or multi-family building such as an apartment. However, if applied to the multi-family building, a single system is installed per one family, each family is not considered as a single room.

Second Embodiment

Next, an air conditioning system in accordance with a second embodiment is explained hereinafter. Similarities to a first embodiment are not explained for omission.

In the first embodiment, an energy-efficient air conditioning system is provided, which has little adverse effect on human body due to a temperature difference. In the air conditioning system, occupancy or unoccupancy in multiple rooms is determined according to information obtained from each of motion sensors and an air conditioning control is performed according to an adjacent spatial distance from an occupied room. In contrast, in the second embodiment, an air conditioning control, when it's understood where an occupant in a specified room moves next, is explained. As such, only changes in a control method different from the first embodiment are explained.

Firstly, functions of system controller 8b are explained with reference to FIG. 11. FIG. 11 is a schematic function block diagram of system controller 8b.

System controller 8b includes air-conditioned room temperature controlling section 23, air volume determining section 24b, fan air volume controlling section 20, total air volume calculating section 25, air volume comparing section 26 and storing section 30. That is, system controller 8b includes air volume determining section 24b instead of air volume determining section 24a in FIG. 3.

Air volume determining section 24b, in addition to air volume determining section 24a, includes change receiving section 44, control changing section 45, virtual occupied-room releasing section 46, virtual unoccupied-room releasing section 47 and timer setting section 48.

Change receiving section 44 receives an occupancy order to change a specified unoccupied room to a virtual occupied room or an unoccupancy order to change a specified occupied room to a virtual unoccupied room through input/output terminal 18.

Control changing section 45 changes the specified unoccupied room to the virtual occupied room or changes the specified occupied room to the virtual unoccupied room according to the occupancy order or the unoccupancy order received by change receiving section 44. Here, the virtual occupied room means being actually unoccupied, but it is virtually considered as being occupied. That is, the virtual occupied room is actually the unoccupied room because the virtual occupied room is actually unoccupied, however, the virtual occupied room is used to set a target air conditioning environment to the unoccupied room in advance, for example, when the occupant schedules to move to the unoccupied room (the virtual occupied room) after a specified time period. The same holds for the virtual unoccupied room. That is, the virtual unoccupied room means being actually occupied, but it is virtually considered as being unoccupied. That is, the virtual unoccupied room is actually the occupied room because the virtual unoccupied room is actually occupied, however, the virtual unoccupied room is used to set a quasi-target air conditioning environment to the occupied room in advance, for example, when the occupant schedules to move from the occupied room (the virtual unoccupied room) after the specified time period.

Virtual occupied-room releasing section 46, after the specified unoccupied room is changed to the virtual occupied room according to a signal from control changing section 45, changes the virtual occupied room to the occupied room when it is determined that the virtual occupied room is occupied according to information obtained from room motion sensor 11.

Virtual unoccupied-room releasing section 47, after the specified occupied room is changed to the virtual unoccupied room according to the signal from control changing section 45, changes the virtual unoccupied room to the unoccupied room when it is determined that the virtual unoccupied room is unoccupied according to the information obtained from room motion sensor 11.

Timer setting section 48 sets a waiting time before occupied-room air conditioning environment controlling section 21 approximates the virtual occupied room to the target air conditioning environment when control changing section 45 changes the specified unoccupied room to the virtual occupied room according to the occupancy order. For example, when setting an air conditioning control to approximate the virtual occupied-room to the target air conditioning environment from six (6) p.m., even if control changing section 45 changes the unoccupied room to the virtual occupied room at five (5) thirty (30) p.m. before six (6) p.m., it's possible to start the air conditioning from six (6) p.m. by setting a waiting time of thirty (30) minutes through timer setting section 48. And when setting an air conditioning control to approximate the virtual occupied-room to the target air conditioning environment before six (6) p.m., even if control changing section 45 changes the unoccupied room to the virtual occupied room at five (5) p.m. before six (6) p.m., it's also possible to start the air conditioning control from five (5) thirty (30) p.m. and provide the air conditioning control before six (6) p.m. by setting the waiting time of thirty (30) minutes through timer setting section 48. The example above describes a case where control changing section 45 receives the occupancy order, the same holds for a case where control changing section 45 receives the unoccupancy order. That is, timer setting section 48 sets a waiting time before unoccupied-room air conditioning environment controlling section 22 approximates the virtual unoccupied room to the quasi-target air conditioning environment when control changing section 45 changes the specified occupied room to the virtual unoccupied room according to the unoccupancy order. For example, when setting an air conditioning control from six (6) p.m., even if control changing section 45 changes the occupied room to the virtual unoccupied room at five (5) thirty (30) p.m. before six (6) p.m., it's possible to start the air conditioning to approximate the virtual unoccupied room to the quasi-target air conditioning environment from six (6) p.m. by setting a waiting time of thirty (30) minutes through timer setting section 48. And when setting an air conditioning control to approximate the virtual unoccupied-room to the quasi-target air conditioning environment before six (6) p.m., even if control changing section 45 changes the occupied room to the virtual unoccupied room at five (5) p.m. before six (6) p.m., it's also possible to start the air conditioning control from five (5) thirty (30) p.m. and provide the air conditioning control to approximate the virtual unoccupied room to the quasi-target air conditioning environment before six (6) p.m. by setting the waiting time of thirty (30) minutes through timer setting section 48.

Hereinafter, as an example, one of specific behaviors of change receiving section 44, control changing section 45, virtual occupied-room releasing section 46, virtual unoccupied-room releasing section 47 and timer setting section 48 is explained with reference to FIG. 12.

FIG. 12 is one example of scheduled movement setting screen displayed on input/output terminal 18. The scheduled movement setting screen is provided to input/output terminal 18 by change receiving section 44, for example, or appears by an application previously installed in input/output terminal 18. A point where the occupant is located on the scheduled movement setting screen is transmitted to input/output terminal 18 as information obtained from room motion sensor 11 through change receiving section 44 and then it appears on a room general view as a human-shaped icon.

In Step 1 of FIG. 12, rooms 2a and 2i are determined as being occupied by room motion sensors 11a and 11i and rooms 2b, 2c, 2d, 2e, 2f and 2g are determined as being unoccupied by room motion sensors 11b, 11c, 11d, 11e, 11f and 11g. For example, when the occupant schedules to move from occupied room 2i to unoccupied room 2f, as indicated in Step 2, the occupant moves the human-shaped icon from occupied room 2i to unoccupied room 2f on the scheduled movement setting screen of input/output terminal 18.

Thus, change receiving section 44 firstly receives the unoccupancy order to change room 2i from the occupied room to the virtual unoccupied room and the occupancy order to change room 2f from the unoccupied room to the virtual occupied room, which are both transmitted from input/output terminal 18 to system controller 8b Next, change receiving section 44 transmits the occupancy order and the unoccupancy order to control changing section 45. In addition, control changing section 45 changes room 2i from the occupied room to the virtual unoccupied room and also changes room 2f from the unoccupied room to the virtual occupied room according to the unoccupancy order and the occupancy order from change receiving section 44.

Subsequently, system controller 8b controls room 2i changed to the virtual unoccupied room to approximate the quasi-target air conditioning environment through unoccupied-room air conditioning environment controlling section 22 and controls room 2f changed to the virtual occupied room to approximate the target air conditioning environment through occupied-room air conditioning environment controlling section 21.

Thus, system controller 8b can understand how the occupant schedules to move between the rooms and previously control the specified unoccupied room to be the target air conditioning environment as the virtual occupied room. Therefore, a temperature difference gets smaller between a room to be occupied and a room currently occupied as a result and it's possible to perform an air conditioning control of less adverse effect on human body compared to that in the first embodiment.

Here, as indicated in Step 3 of FIG. 12, it's also possible for the occupant to set a waiting time of thirty (30) minutes before the air conditioning control is started. Specifically, for example, given that the occupant is viewing a TV program in occupied room 2i and schedules to move to unoccupied room 2f after forty (40) minutes when the TV program ends, in this case, the occupant, as indicated in Step 2, moves the human-shaped icon from occupied room 2i to unoccupied room 2f on input/output terminal 18. And, as indicated in Step 3, the waiting time of thirty (30) minutes is set on the number line by the occupant. Here, the reason why the waiting time is thirty (30) minutes is to secure a ten-minute air conditioning time before the occupant moves to room 2f after forty (40) minutes. FIG. 12 indicates an example that the waiting time can be set on the number line.

When change receiving section 44 receives the occupancy order and the unoccupancy order, timer setting section 48 receives the waiting time of thirty (30) minutes transmitted to system controller 8b from input/output terminal 18. Next, timer setting section 48 transmits a waiting order including the waiting time of thirty (30) minutes, which is input to occupied-room air conditioning environment controlling section 21 or unoccupied-room air conditioning environment controlling section 22. The waiting order here means that the virtual occupied room and the virtual unoccupied room can be air-conditioned by occupied-room air conditioning environment controlling section 21 or unoccupied-room air conditioning environment controlling section 22 after the input waiting time lapses. Thus, occupied-room air conditioning environment controlling section 21 and unoccupied-room air conditioning environment controlling section 22 start air conditioning control for the virtual occupied room or the virtual unoccupied room after the waiting time of thirty (30) minutes lapses.

The waiting time can be set by time setting section 48, therefore, the occupant can previously input a scheduled time of movement according to its convenience.

System controller 8b transmits information obtained from room motion sensors 11i and 11f to virtual occupied-room releasing section 46 and virtual unoccupied-room releasing section 47. After the occupant actually moves, virtual occupied-room releasing section 46 changes room 2f from the virtual occupied room to the occupied room according to information obtained from room motion sensor 11f. In addition, virtual unoccupied-room releasing section 47 changes room 2i from the virtual unoccupied room to the unoccupied room according to information obtained from room motion sensor 11i. Thus, other than the control above described, the same control as the first embodiment can be provided.

A range of time and a display format by the number line are only examples, not limited to thereto.

The above example displayed on input/output terminal 18 is only an example, not limited to thereto.

Third Embodiment

Subsequently, the third embodiment is explained hereinafter. Similarities to the first embodiment are not explained for omission.

Firstly, air conditioning system 19 in accordance with the second embodiment of the present disclosure is explained with reference to FIG. 13 and FIG. 2. FIG. 13 is a connection schematic diagram of air conditioning system 19 in accordance with the embodiment and FIG. 2 shows an example of room layout of general residence 1 in accordance with the embodiment. And FIG. 2 is as explained in the first embodiment. FIG. 13 is identical to FIG. 1 already explained except that room motion sensor 11 is removed from FIG. 1.

Next, functions of system controller 8c are explained with reference to FIG. 14. FIG. 14 is a schematic function block diagram of system controller 8c.

System controller 8c includes air-conditioned room temperature controlling section 23, air volume determining section 24c, fan air volume controlling section 20, total air volume calculating section 25, air volume comparing section 26 and storing section 30. That is, system controller 8c includes air volume determining section 24c instead of air volume determining section 24a in FIG. 3.

Air volume determining section 24c includes space information storing section 43, target air conditioning environment obtaining section 33b, quasi-target air conditioning environment storing section 34b, room air conditioning environment controlling section 41, non-room air conditioning environment controlling section 42, first temperature comparing section 27, second temperature comparing section 28 and temperature difference comparing section 29.

Space information storing section 43 stores information of each of rooms 2a to 2i, the room each being classified into one of a room and a non-room. Each of the rooms is associated with each of room temperature sensors 9a to 9i, each of transfer fans 3a to 3i and each of circulation fans 6a to 6i. Here, the room means a space where it is occupied for a long time while living in a house. That is, the room means a living room (room), a dining room (kitchen and eating space), bedrooms, children's rooms, and so forth. The non-room means a space forming part of the house where the room is not included. That is, the non-room means a toilet, a storage, a bathroom, a restroom, a dressing room, a hallway, an entrance, and so forth. When the kitchen is normally occupied for a short time, the kitchen may be naturally the non-room and vice versa. Controlled spaces intended for air conditioning may be classified into either the room or the non-room.

Target air conditioning environment obtaining section 33b, when room 2 is determined as being the room according to information from space information storing section 43, obtains the target air conditioning environment set to room 2 through input/output terminal 18.

Quasi-target air conditioning environment storing section 34b stores the quasi-target air conditioning environment of the non-room corresponding to the target air conditioning environment. Setting examples of the target air conditioning environment (temperature) of the room and the quasi-target air conditioning environment (temperature) of the non-room according to the information stored by quasi-target air conditioning environment storing section 34b are indicated below.

During summer, that is, the cooling period, quasi-target air conditioning environment storing section 34b stores the quasi-target air conditioning temperature for the non-room 2 degrees C. higher than the target air conditioning temperature for the room. Similarly, during winter, that is, the heating period, quasi-target air conditioning environment storing section 34b stores the quasi-target air conditioning temperature for the non-room 2 degrees C. lower than the target air conditioning temperature for the room.

For example, in FIG. 2, given that the target air conditioning temperature of the room is 20 degrees C. during summer, that is, the cooling period, the quasi-target air conditioning temperature of the non-room is 22 degrees C. Similarly, given that the target air conditioning temperature of the room is 20 degrees C. during winter, that is, the heating period, the quasi-target air conditioning temperature of the non-room is 18 degrees C.

Room air conditioning environment controlling section 41 determines the air volume of each of transfer fans 3 according to the target air conditioning environment (temperature) of the room set by input/output terminal 18 through target air conditioning environment obtaining section 33b, the temperature of air-conditioned room 17 controlled by air-conditioned room temperature controlling section 23 and the indoor temperature of each of the rooms obtained by each of the room temperature sensors.

Non-room air conditioning environment controlling section 42 determines the air volume of each of transfer fans 3 according to the quasi-target air conditioning environment (temperature) of the non-room determined based on information from target air conditioning environment obtaining section 33b and space information storing section 43, the temperature of air-conditioned room 17 controlled by air-conditioned room temperature controlling section 23 and the indoor temperature of each of the non-rooms obtained by each of room temperature sensors 9. A determining procedure of the air volume is as described in the first embodiment. As above, thus, it is possible to provide the room with the user-desired and most comfortable target air conditioning environment and provide the non-room with the quasi-target air conditioning environment with the lower energy burden. Thus, the energy burden can be lowered compared that the target air conditioning environment is set to each of the rooms. And that, a more comfortable target air conditioning environment is provided to the room expected to be occupied longer than the non-room. Therefore, there is a high possibility to provide the air conditioning environment comfortable to the occupant and a whole-house air conditioning with a simple structure and the lower energy burden.

Obviously, even if the occupant moves from the room to the non-room, it is unlikely to change the air conditioning environment. Therefore, the adverse effect brought by the sudden environmental change, for example, the shock from the temperature change, can be controlled. In the first embodiment, the second embodiment and the third embodiment described above, the temperature is taken as the air conditioning environment for explanation. However, the whole-house air conditioning using the air-conditioned room can adjust also a humidity environment of each of the rooms by controlling the humidity environment in the air-conditioned room and the air volume of each of the transfer fans. That is, when focusing on the humidity as the air conditioning environment, the humidity of the air-conditioned room can be maintained at the target air conditioning environment (humidity) where the most comfortable humidity is provided. The occupied room or the room can be maintained at the target air conditioning environment (humidity) by increasing the air volume of the transfer fan, and the unoccupied room or the non-room can be maintained at the quasi-target air conditioning environment (humidity) by providing the air volume of the transfer fan less than that of the occupied room or the room.

Of course, a cleanliness environment of each of the rooms can be also adjusted by controlling the cleanliness environment and the air volume of each of the transfer fans in the air-conditioned room. That is, when focusing on the cleanliness as the air conditioning environment, the cleanliness of the air-conditioned room can be maintained at the target air conditioning environment (cleanliness) where the highest cleanliness required is set. The occupied room or the room can be maintained at the target air conditioning environment (cleanliness) by increasing the air volume of the transfer fan, and the unoccupied room or the non-room can be maintained at the quasi-target air conditioning environment (cleanliness) by providing the air volume of the transfer fan less than that of the occupied room or the room.

Thus, for not only the temperature but also the humidity and the cleanliness, an energy-saving whole-house air conditioning can be achieved.

INDUSTRIAL APPLICABILITY

In the air conditioning system in accordance with the disclosure, an effective whole-house air conditioning can be performed with more energy-efficient operation than before by determining whether multiple rooms are occupied or unoccupied, or they are rooms or non-rooms.

REFERENCE MARKS IN THE DRAWINGS 1 general residence
2, 2a, 2b, 2c, 2d, 2e, room
2f, 2g, 2h, 2i
3, 3a, 3b, 3c, 3d, 3e, transfer fan
3f, 3g, 3h, 3i
4 outdoor air introducing fan
5, 5a, 5b, 5c, 5d, 5e, exhaust fan
5f, 5g, 5h, 5i
6, 6a, 6b, 6c, 6d, 6e, circulation fan
6f, 6g, 6h, 6i
7 air conditioner
8, 8a, 8b, 8c system controller
9, 9a, 9b, 9c, 9d, 9e, room temperature sensor
9f, 9g, 9h, 9i
10, 10a, 10b, 10c, room humidity sensor
10d, 10e, 10f, 10g,
10h, 10i
11, 11a, 11b, 11c, 11d, room motion sensor
11e, 11f, 11g, 11h, 11i
12 air-conditioned room temperature sensor
13 air-conditioned room humidity sensor
15 humidifier
16 dehumidifier
17 air-conditioned room
18 input/output terminal
19 air conditioning system
20 fan air volume controlling section
21 occupied-room air conditioning environment controlling section
22 unoccupied-room air conditioning environment controlling section
23 air-conditioned room temperature controlling section
24a, 24b, 24c air volume determining section
25 total air volume calculating section 26 air volume comparing section
27 first temperature comparing section
28 second temperature comparing section
29 temperature difference comparing section
30 storing section
32 occupied-room/unoccupied-room determining section
33a, 33b target air conditioning environment obtaining section
34a, 34b quasi-target air conditioning environment storing section
40 air cleaner
41 room air conditioning environment controlling section
42 non-room air conditioning environment controlling section
43 space information storing section
44 change receiving section
45 control changing section
46 virtual occupied-room releasing section
47 virtual unoccupied-room releasing section
48 timer setting section

The invention claimed is:

1. An air conditioning system for performing air conditioning of a house by transferring air conditioned in an air-conditioned room, the air conditioning system comprising:
   transfer fans for transferring the air to rooms that are spaces in the house from the air-conditioned room;
   room motion sensors for detecting whether each of the rooms is occupied or unoccupied; and
   an air conditioning system controller for controlling each of the transfer fans,
   wherein the air conditioning system controller includes:
   a first target air conditioning environment obtaining section for obtaining at least a target air conditioning temperature of each of the rooms;
   an occupied-room air conditioning environment controlling section for determining whether a room is occupied or unoccupied according to information from the room motion sensor and controlling a transfer fan that transfers the air to an occupied room that is determined as being occupied among the rooms so that an air conditioning environment of the occupied room is approximated to the first target air conditioning environment; and
   an unoccupied-room air conditioning environment controlling section for determining whether the room is occupied or unoccupied according to the information from the room motion sensor and controlling a transfer fan that transfers the air to an unoccupied room that is determined as being unoccupied among the rooms so that an air conditioning environment of the unoccupied room is approximated to a second target air conditioning environment where an energy burden is lower than an energy burden of the first target air conditioning environment for the occupied room,
   wherein the unoccupied-room air conditioning environment controlling section changes the second target air conditioning environment of the unoccupied room according to an adjacent spatial distance from the occupied room and,
   the adjacent spatial distance is a value indicating how many accessible spaces exist between the occupied room and the unoccupied room.

2. The air conditioning system according to claim 1, wherein the unoccupied-room air conditioning environment controlling section controls the unoccupied room with more adjacent spatial distance to be the second target air conditioning environment where the energy burden is lower.

3. The air conditioning system according to claim 1, wherein the air conditioning system controller includes:
   a change receiving section for receiving an occupancy order that intends to change a specified unoccupied room among the rooms to a virtual occupied room; and
   a control changing section for changing the specified unoccupied room to the virtual occupied room according to the occupancy order received through the change receiving section,
   wherein the occupied-room air conditioning environment controlling section controls a transfer fan that transfers the air to the virtual occupied room so that the unoccupied room previously set to the virtual occupied room is approximated to the first target air conditioning environment, and
   the virtual occupied room is a room which is actually unoccupied but virtually considered as being occupied.

4. The air conditioning system according to claim 3, wherein the air conditioning system controller includes a virtual occupied-room releasing section for changing the virtual occupied room to the occupied room when the virtual occupied room is detected to be occupied according to the information from the motion sensor of the virtual occupied room.

5. The air conditioning system according to claim 3, wherein the occupancy order contains information related to a specified waiting time, and the air conditioning system controller includes a timer setting section for setting a waiting time before approximating the unoccupied room previously set to the virtual occupied room to the first target air conditioning environment according to the waiting time when the control changing section receives the occupancy order through the change receiving section.

6. The air conditioning system according to claim 1, wherein the air conditioning system controller includes:
   the change receiving section for receiving a non-occupancy order that intends to change a specified occupied room to a virtual unoccupied room; and
   the control changing section for changing the specified occupied room to the virtual unoccupied room according to the non-occupancy order received through the change receiving section,
   wherein the unoccupied-room air conditioning environment controlling section controls a transfer fan that transfers the air to the virtual unoccupied room so that the occupied room previously set to the virtual unoccupied room is approximated to the second target air conditioning environment; and
   the virtual unoccupied room is a room which is actually occupied but virtually considered as being unoccupied.

7. The air conditioning system according to claim 6, wherein the air conditioning system controller includes a virtual unoccupied-room releasing section for changing the virtual unoccupied room to the unoccupied room when the virtual unoccupied room is detected to be unoccupied according to the information from the motion sensor of the virtual unoccupied room.

8. The air conditioning system according to claim 6, wherein the non-occupancy order contains the information related to the specified waiting time, and the air conditioning system controller includes the timer setting section for setting the waiting time before approximating the occupied room previously set to the virtual unoccupied room to the second target air conditioning environment according to the waiting time when the control changing section receives the non-occupancy order through the change receiving section.

9. The air conditioning system according to claim 1, wherein the target air conditioning environment at least includes a humidity or a cleanliness.

10. The air conditioning system according to claim 1, wherein the adjacent spatial distance is not a linear distance from the occupied room and the unoccupied room.

11. The air conditioning system according to claim 1, wherein the accessible spaces do not include spaces which are not accessible from the occupied room.

12. An air conditioning system for performing air conditioning of a room and a non-room in a house by transferring air conditioned in an air-conditioned room, the air conditioning system comprising:
   transfer fans for transferring the air to the room and the non-room from the air-conditioned room; and
   an air conditioning system controller for controlling each of the transfer fans,
   wherein the air conditioning system controller includes:
   a target air conditioning environment obtaining section for at least obtaining a first target air conditioning environment for each of the rooms;
   a room air conditioning environment controlling section for controlling a transfer fan that transfers the air to the room so that the room is approximated to the first target air conditioning environment; and
   a non-room air conditioning environment controlling section for controlling a transfer fan that transfers the air to the non-room so that the non-room is approximated to a second target air conditioning environment where an energy burden is lower than an energy burden of the target air conditioning environment, and
   wherein the unoccupied-room air conditioning environment controlling section changes the second target air conditioning environment of the unoccupied room according to an adjacent spatial distance from the occupied room and,
   the adjacent spatial distance is a value indicating how many accessible spaces exist between the occupied room and the unoccupied room.

13. The air conditioning system according to claim 12, wherein the target air conditioning environment at least includes a temperature, a humidity or a cleanliness.

14. The air conditioning system according to claim 12, wherein the adjacent spatial distance is not a linear distance from the occupied room and the unoccupied room.

15. The air conditioning system according to claim 12, wherein the accessible spaces do not include spaces which are not accessible from the occupied room.

* * * * *